United States Patent
Kurachi et al.

(10) Patent No.: US 8,572,472 B2
(45) Date of Patent: Oct. 29, 2013

(54) FAULT DETECTION APPARATUS, FAULT DETECTION METHOD, AND FAULT DETECTION PROGRAM

(75) Inventors: Haruyuki Kurachi, Chiyoda-ku (JP); Atsuko Onishi, Chiyoda-ku (JP); Takashi Tagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 958 days.

(21) Appl. No.: 12/443,627

(22) PCT Filed: Sep. 27, 2007

(86) PCT No.: PCT/JP2007/068802
§ 371 (c)(1),
(2), (4) Date: Mar. 30, 2009

(87) PCT Pub. No.: WO2008/038710
PCT Pub. Date: Apr. 3, 2008

(65) Prior Publication Data
US 2010/0100799 A1    Apr. 22, 2010

(30) Foreign Application Priority Data
Sep. 28, 2006    (JP) .................................. 2006-264959

(51) Int. Cl.
*G06F 11/00* (2006.01)
(52) U.S. Cl.
USPC ....................................................... 714/819
(58) Field of Classification Search
USPC ....................................................... 714/819
See application file for complete search history.

(56) References Cited

U.S. PATENT DOCUMENTS

| | | | |
|---|---|---|---|
| 4,566,101 A | 1/1986 | Skonieczny et al. | |
| 5,394,409 A | 2/1995 | Barthel et al. | |
| 6,252,428 B1 * | 6/2001 | Barsoum et al. | 327/49 |
| 6,333,751 B1 * | 12/2001 | Torii et al. | 345/698 |
| 6,725,402 B1 | 4/2004 | Cross, Jr. et al. | |
| 7,054,786 B2 | 5/2006 | Sakano et al. | |
| 7,958,430 B1 * | 6/2011 | Kolokowsky et al. | 714/763 |
| 2002/0004925 A1 | 1/2002 | Kodama et al. | |
| 2002/0124663 A1 | 9/2002 | Tokumoto et al. | |
| 2003/0066023 A1 * | 4/2003 | Lee et al. | 714/799 |
| 2004/0125015 A1 * | 7/2004 | King et al. | 342/357.06 |
| 2004/0229315 A1 | 11/2004 | Lee et al. | |
| 2005/0160360 A1 * | 7/2005 | Nadamoto et al. | 715/513 |

FOREIGN PATENT DOCUMENTS

| | | |
|---|---|---|
| DE | 34 07 263 A1 | 8/1984 |
| JP | 52-100068 A | 8/1977 |
| JP | 57-023118 A | 2/1982 |
| JP | 58-119244 A | 7/1983 |

(Continued)

OTHER PUBLICATIONS

Decision of Patent Grant in corresponding Japanese Patent Application No. 2008-536422 dated Jan. 31, 2012.

*Primary Examiner* — Scott Baderman
*Assistant Examiner* — Jigar Patel
(74) *Attorney, Agent, or Firm* — Sughrue Mion, PLLC

(57) ABSTRACT

A comparison unit compares polarities of a plurality of redundant input signals. A comparison-result storing unit stores a comparison result of the comparison unit for each predetermined sampling cycle. A judgment unit judges whether the redundant input signals are normal using a plurality of comparison results for a predetermined number of samplings in a time-series order from a latest comparison result among a plurality of comparison results stored in the comparison-result storing unit.

20 Claims, 15 Drawing Sheets

(56) References Cited

FOREIGN PATENT DOCUMENTS

| | | |
|---|---|---|
| JP | 04-367003 A | 12/1992 |
| JP | 05-225481 A | 9/1993 |
| JP | 08-221116 A | 8/1996 |
| TW | 131130 | 3/1990 |
| TW | 327221 | 2/1998 |
| TW | 406225 B | 9/2000 |
| TW | 499702 B | 8/2002 |
| TW | 589691 B | 6/2004 |
| WO | 98/48785 A2 | 11/1998 |
| WO | 2005/026317 A2 | 3/2005 |

* cited by examiner

FIG.9

| JUDGMENT MODE | WEIGHTING |
|---|---|
| THRESHOLD VALUE JUDGMENT | WITHOUT |
| THRESHOLD VALUE JUDGMENT | WITH |
| PATTERN JUDGMENT | – |
| THRESHOLD VALUE OR PATTERN JUDGMENT | WITHOUT |
| THRESHOLD VALUE OR PATTERN JUDGMENT | WITH |
| THRESHOLD VALUE AND PATTERN JUDGMENT | WITHOUT |
| THRESHOLD VALUE AND PATTERN JUDGMENT | WITH |

# FAULT DETECTION APPARATUS, FAULT DETECTION METHOD, AND FAULT DETECTION PROGRAM

TECHNICAL FIELD

The present invention relates to a fault detection apparatus that compares a plurality of redundant input signals and judges normality or abnormality of the input signals by filtering results of comparing the redundant input signals.

BACKGROUND ART

At a production site, a remote master station and a plurality of sequencers (remote I/O stations) are connected using a transmission cable and the like to enable the remote master station to communicate with each remote I/O station, configuring a network to control various devices such as a solenoid valve, a motor, and a sensor connected to the remote I/O stations. That is, the remote master station controls and monitors the devices connected to each remote I/O station through the remote I/O station.

In addition, the remote I/O station includes an input detection circuit to detect a fact that input units such as a push button, a lever and a switch were operated by a user. This input detection unit corresponds to one input unit (for example, a push button), when the push button is pressed, a plurality of switches are turned on and input detection signals up to the number of switches are output. That is, the input detection circuit outputs a fact that one input unit was operated by making the plurality of the input detection signals redundant.

All such redundant input detection signals have a same polarity if the push button and the input detection circuit (such as a switch or a wiring) are normal; however, for example, if a foreign substance enters in one of the switches in the input detection circuit, or a wiring with a power supply or a ground is broken, at least one polarity of the redundant input detection signals might differ from other input detection signals. As a conventional technique to detect such a state, that is, an abnormality of redundant input detection signals, for example, Patent Documents 1 is known.

In order to recognize an error of two signal transmitters having a double redundancy of the automatic facility and find the position thereof, Patent Documents 1 discloses a technique related to an error detection recognition method of a signal transmitter having a redundancy for an automatic facility, which automatically recognizes not only a conducting wire failure but also the error of the transmitters at a high rate and finds the position thereof.

Specifically, a difference detector, which is an exclusive OR (XOR) element, detects whether or not signals from two signal transmitters accord with each other, and if the signals do not accord with each other, a timer device is started to start a measurement of a wait time T, and when the measurement of the wait time T is finished, a judgment whether or not the signals from the two signal transmitters are normal is performed.

Patent Document 1: JPA H5-225481 (KOKAI)

DISCLOSURE OF INVENTION

Problem to be Solved by the Invention

However, there is a problem that because the technique described in Patent Documents 1 is made to start the measurement of the wait time T after newly starting the timer every time when disaccord of the input signals (signals from the two transmitters) is detected, if the disaccord of the input signals frequently occurs affected by noise or other causes (if the disaccord of the input signals occurs again during the measurement of the wait time T), the measurement of the wait time T newly starts, making it unable to detect a failure, or causing a delay in the timing of detecting the failure.

In order to prevent such a problem, it is considerable that the measurement of the wait time T is not started every time when the disaccord is detected, but the measurement of the wait time T is continued, and after the wait time T is passed, whether or not the input signals are normal is judged. However, in this situation, another problem that changes of the input signals during the wait time T cannot be taken into consideration might occur.

The present invention is made in view of the situation, and an object of the present invention is to provide to a fault detection apparatus, a fault detection method, and a fault detection program that can accurately detect a malfunction in accordance with the changes of a plurality of redundant input signals in a predetermined time interval.

Means for Solving Problem

To solve the above problems and to achieve the object, a fault detection apparatus according to the present invention includes a comparison unit that compares polarities of a plurality of redundant input signals, whether the polarities match with each other; a comparison-result storing unit that stores therein a comparison result of the comparison unit for each predetermined sampling cycle; and a judgment unit that judges whether the redundant input signals are normal using a plurality of comparison results for a predetermined number of samplings in a time-series order from a latest comparison result among a plurality of comparison results stored in the comparison-result storing unit.

Effect of the Invention

According to the present invention, a comparison unit compares polarities of a plurality of redundant input signals, whether the polarities match with each other, a comparison-result storing unit stores therein a comparison result of the comparison unit for each predetermined sampling cycle, and a judgment unit judges whether the redundant input signals are normal using a plurality of comparison results for a predetermined number of samplings in a time-series order from a latest comparison result among a plurality of comparison results stored in the comparison-result storing unit. Therefore, a state of normal or abnormal can be judged in accordance with accord or disaccord of comparison results of the number of samplings from the latest comparison result. That is, a fault detection apparatus capable of judging normal or abnormal in accordance with the changes of a plurality of redundant input signals in a predetermined time interval of "sampling cycle×number of samplings" can be obtained.

BRIEF DESCRIPTION OF DRAWINGS

FIG. 9 is a list showing a judgment condition and with or without weighting that are set in a judgment-mode setting unit in the fault detection apparatus shown in FIG. 8.

Figure 1:
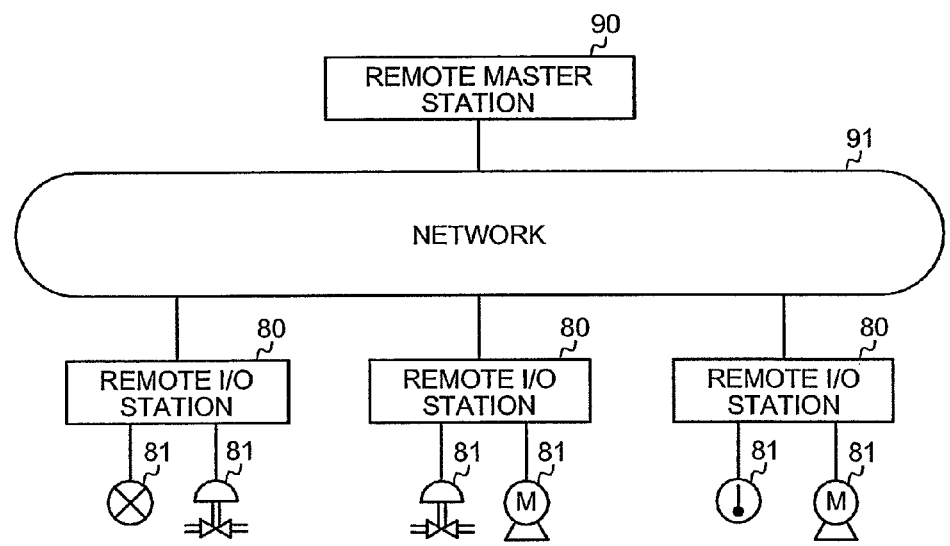
FIG. 1 is a block diagram illustrating an example of a configuration of a network system applicable to a fault detection apparatus in the present invention.

EXPLANATIONS OF LETTERS OR NUMERALS 1 setting unit
2 clock generation unit
3 comparison unit
4 comparison-result storing unit
5, 5a judgment unit
6 first comparison-result storing unit
7 second comparison-result storing unit
8 comparison-result control unit
9, 9a reset-signal generation unit
11 sampling-count setting unit
12 sampling-cycle setting unit
13 judgment-threshold-value setting unit
14 judgment-mode setting unit
15 weight setting unit
16 pattern setting unit
18 reset-condition setting unit
41-1, 41-2, 41-3, 41-4, 41-5, 41-n latch
71-1, 71-2, 71-3, 71-m buffer

BEST MODE(S) FOR CARRYING OUT THE INVENTION

Exemplary embodiments of a fault detection apparatus, a fault detection method, and a fault detection program according to the present invention will be explained below in detail with reference to the accompanying drawings. It is understood that the present invention is not limited to the specific embodiments described below.

First embodiment

A first embodiment is explained with reference to FIGS. 1 to 4. FIG. 1 is a block diagram illustrating an example of a configuration of a network system applicable to a fault detection apparatus in the present invention. In FIG. 1, the network system is connected to a remote I/O station 80 to which devices 81 (for example, a solenoid valve, a motor, a sensor, etc.) that become targets for control and monitor, and a remote master station 90 through a network 91. The remote master station 90 controls and monitors the devices 81 through the remote I/O station 80.

In addition, the remote I/O station 80 includes an input detection circuit to detect a fact that input units such as a push button, a lever and a switch were operated by a user, and the fault detection apparatus detects an abnormality of the input detection circuit. The input detection circuit includes a plurality of switches. The input detection circuit corresponds to one input unit (for example, a push button), when the push button is pressed, multiple switches are turned on and input detection signals up to the number of switches are output. That is, the input detection circuit outputs a fact that one input unit was operated by making the multiple input detection signals redundant. Therefore, if the input unit and the input detection circuit operate normally, the multiple input detection signals have a same polarity; and if the input unit and the input detection circuit malfunction or are affected by a noise, the polarities of the multiple input detection signals might become different. The fault detection apparatus in accordance with the present invention judges normal or abnormal by making the redundant signals as inputs in this way.

Figure 2:
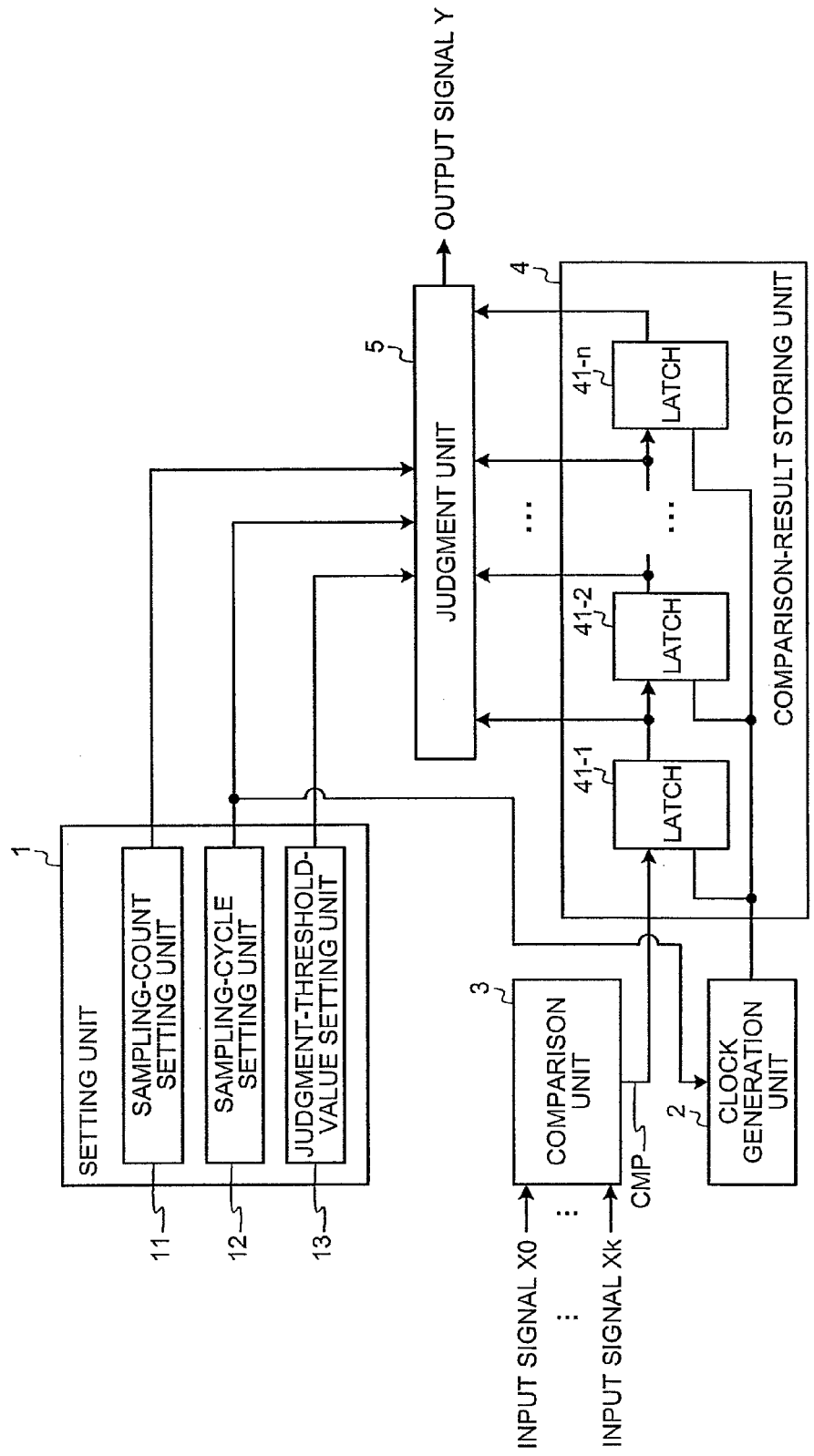
FIG. 2 is a block diagram illustrating a configuration of a fault detection apparatus in accordance with a first embodiment of the present invention.

FIG. 2 is a block diagram illustrating a configuration of the fault detection apparatus in accordance with the first embodiment of the present invention. In FIG. 2, the fault detection apparatus includes a setting unit that has a comparison unit 3, a sampling-count setting unit 11, a sampling-cycle setting unit 12, and a judgment-threshold-value setting unit 13, a comparison-result storing unit 4 that has a clock generation unit 2 and n (1<n, n: natural number) latches 41 (which represents 41-1 to 41-n), and a judgment unit 5.

The comparison unit 3 compares redundant k (1<k, k: natural number) input signals X0 to Xk, and judges whether or not all the input signals X0 to Xk are accord with each other. The comparison unit 3 outputs comparison results CMP to the comparison-result storing unit 4.

The setting unit 1 is set to various kinds of setting values related to the operation of the fault detection apparatus. The various kinds of setting values that the setting unit 1 holds are set through a communication from the remote master station 90 just the same as control parameters for the devices 81 to which the remote I/O station 80 is connected. That is, the user can set any values.

The sampling-cycle setting unit 12 is set to a clock cycle to memorize the comparison results from the comparison unit 3, that is, a sampling cycle of the comparison results. The sampling-count setting unit 11 is set to the number of the comparison results that the judgment unit 5 uses for judging normal or abnormal, that is, a number of samplings of the comparison results. The judgment-threshold-value setting unit 13 is set to a judgment threshold value that the judgment unit 5 uses for judging normal or abnormal.

The clock generation unit 2 generates a sampling clock with the sampling cycle set in the sampling-cycle setting unit 12 using a clock used in a transmitter and the remote I/O station 80, and supplies the generated sampling clock to the latches 41 in the comparison-result storing unit 4.

The comparison-result storing unit 4 configures a shift register with n latches 41, holds n comparison results from the present clock time to before "n×sampling cycle" synchronized with a rising or falling edge of the sampling clock supplied from the clock generation unit 2. In FIG. 2, because the latches 41 are connected in the order of the latch 41-1, the latch 41-2, ..., and the latch 41-n, the comparison result in the present sampling cycle is held in the first stage latch 41-1, the comparison result in the sampling cycle at one cycle before the present sampling cycle is held in the latch 41-2, ..., and the comparison result in the sampling cycle at n−1 cycles before the present sampling cycle is held in the latch 41-n. The latches 41 output the held comparison results to the judgment unit 5.

The judgment unit 5 has a counting function to count the number of comparison results showing that at least one of the input signals X0 to Xk among the comparison results input from latches 41 is disaccord with other, and performs a threshold value judgment processing that judges normal or abnormal of the input signals X0 to Xk based on the count value of the comparison results showing disaccord, the number of samplings set in the sampling-count setting unit 11, and the judgment threshold value set in the judgment-threshold-value setting unit 13.

Specifically, the judgment unit 5 counts the number of the comparison results showing disaccord among the comparison results of the number of samplings from the first stage latch 41-1 that holds the present comparison result to the latches 41 of the number of samplings, that is, among the comparison results from the time of the present sampling cycle to the time of "sampling cycle×number of samplings", the number of comparison results showing disaccord is counted. The judgment unit 5 compares the count value with the judgment threshold value, and if the count value is greater than or equal to the judgment threshold value, the judgment unit 5 judges as abnormal; if the count value is less than the judgment threshold value, the judgment unit 5 judges as normal. The judgment unit 5 outputs a judgment result as an output signal Y.

Figure 3:
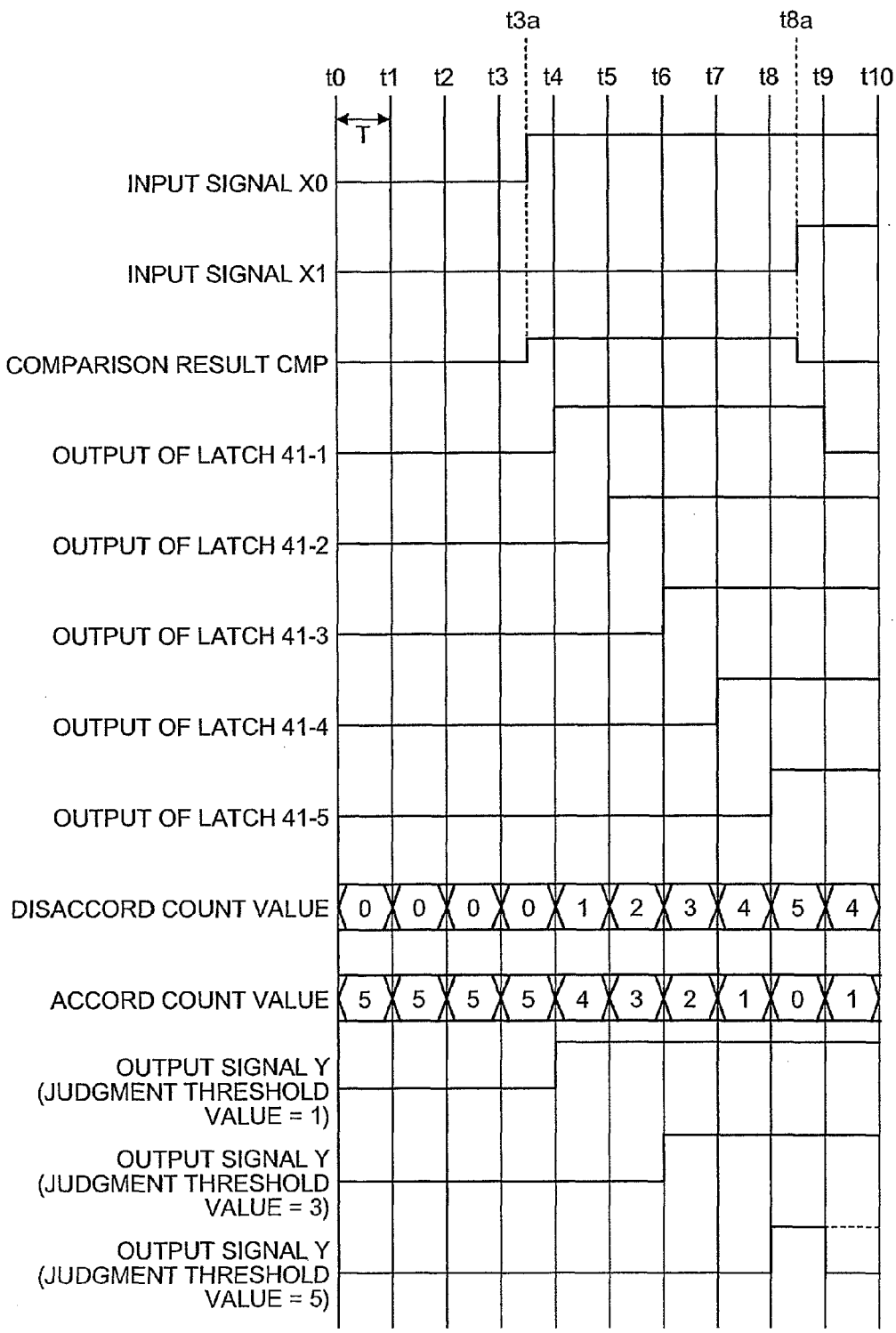
FIG. 3 is a timing chart illustrating an operation of a fault detection apparatus in accordance with the first embodiment of the present invention.
Figure 4:
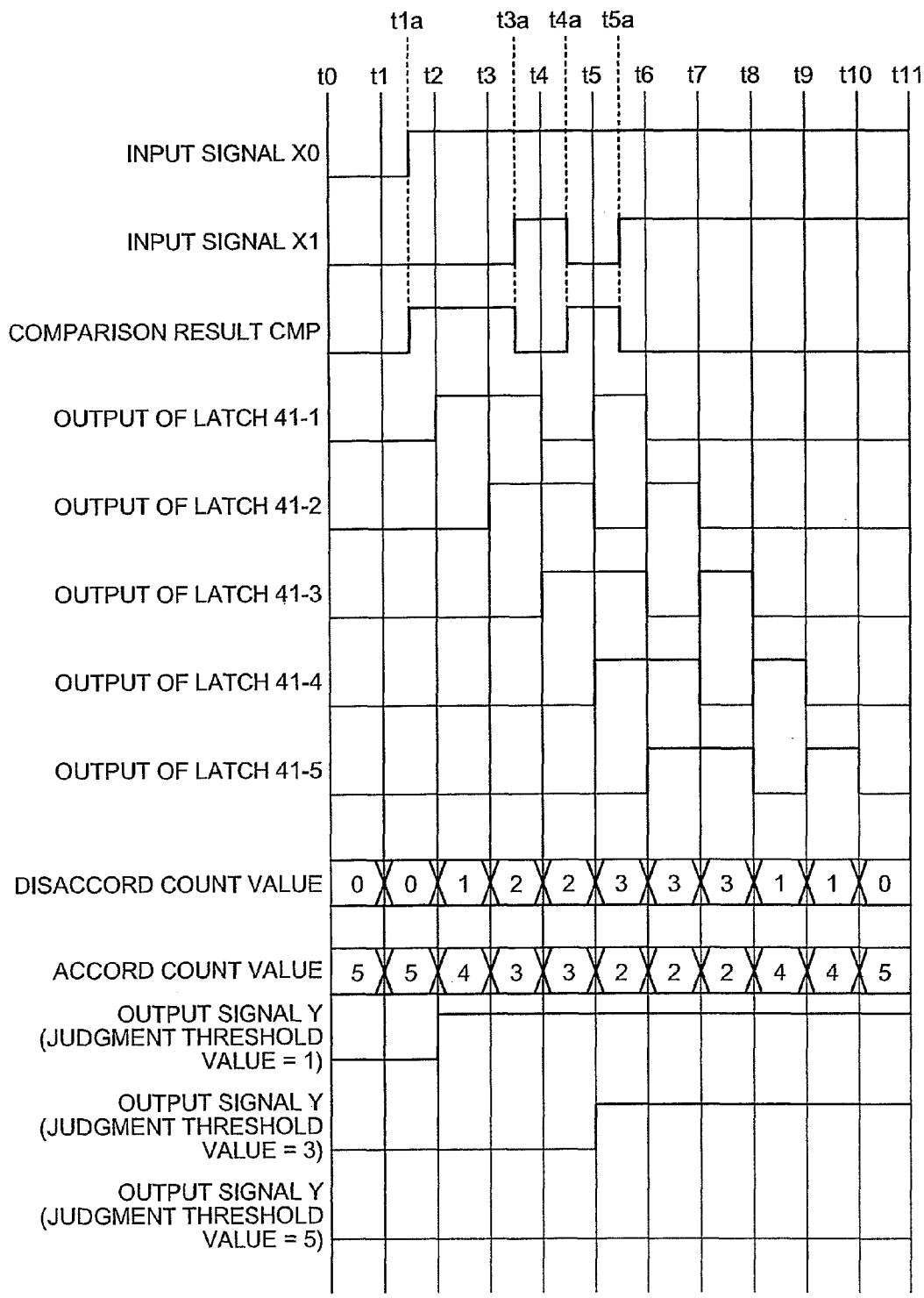
FIG. 4 is a timing chart illustrating an operation of a fault detection apparatus in accordance with the first embodiment of the present invention.

Operation of the fault detection apparatus in accordance with the present invention is explained by citing an example when the number of input signals is "2" (k=2), sampling cycle is "T", and the number of samplings is "5" with reference to timing charts in FIGS. 3 and 4, and FIG. 1.

First, the operation of the fault detection apparatus when the input signal X0 is continuously disaccord with the input signal X1 for longer than a filtering processing time (which is "sampling cycle×number of samplings" time, and is 5T in this situation) is explained. In addition, the latches 41-1 to 41-5 before a clock time t0 are assumed to hold the comparison results showing accord.

At the clock time t0, because both input signals X0 and X1 are "L", the comparison unit 3 makes the comparison result CMP into a comparison result (in this situation "L") showing that the input signal X0 is accord with the input signal X1. The latches 41-2 to 41-5 hold the outputs of the former stage latches 41-1 to 41-5, and the first stage latch 41-1 holds the comparison result CMP. In this situation, the latches 41-1 to 41-5 hold "L". The judgment unit 5 judges whether or not outputs (held values) of the latches are a comparison result (in this situation "H") and counts the number of comparison results showing disaccord. In this situation, because all the outputs of the latches 41-1 to 41-5 are "L", the disaccord count becomes "0". In addition, in FIG. 3, the number of comparison results showing accord is also illustrated for reference. Because the disaccord count value is "0", at any situation when the judgment threshold value is "1", "3", or "5", the judgment unit 5 makes the output signal Y into "L" showing normal.

During the clock time t0 to a clock time t3, the input signals X0 and X1 do not change. Therefore, from the clock time t0 to a clock time t1 or to the clock time t3 at every sampling time T, the situation becomes the same as that at the clock time t0. At a clock time t3a, the input signal X0 changes from "L" to "H". With this, the comparison unit makes the comparison result CMP into a comparison result (in this situation "H") showing that the input signal X0 is disaccord with the input signal X1.

At clock time t4, the latches 41-2 to 41-5 hold the outputs ("L") of the former stage latches 41-1 to 41-4 and the first stage latch 41-1 holds the comparison result CMP ("H"). With this, the disaccord count value of the judgment unit becomes "1". If the judgment threshold value is "1" (perfect accord judgment by the filtering processing), because the disaccord count value is greater than or equal to the judgment threshold value, the judgment unit 5 makes the output signal Y into "H" showing abnormal. If the judgment threshold value is "3" (majority judgment by the filtering processing) or the judgment threshold value is "5" (perfect disaccord judgment by the filtering processing), because the disaccord count value is less than the judgment threshold value, the judgment unit 5 makes the output signal Y into "L".

From the clock time t3a to a clock time t8a, because input signal X0 is "H" and the input signal X1 is "L", the comparison unit 3 makes the comparison result into "H". From a clock time t4 to a clock time t8, the latches 41-2 to 41-5 hold the outputs of the former stage latches 41-1 to 41-4 and the first stage latch 41-1 holds the comparison result CMP. With this, at the clock times t4, t5, t6, t7, and t8, the judgment unit 5 counts up the disaccord count value as "1", "2", "3", "4", "5". If the judgment threshold value is "3", the disaccord count value becomes greater than or equal to the judgment threshold value at the clock time t6. As a result, the judgment unit 5 makes the output signal Y into "H". In addition, if the judgment threshold value is "5", the disaccord count value becomes greater than or equal to the judgment threshold value at the clock time t8. As a result, the judgment unit 5 makes the output signal Y into "H".

At the clock time t8a, the input signal X1 changes from "L" to "H". Because both the input signal X0 and input signal X1 are "H", the comparison unit 3 makes the comparison result CMP into "L". The latches 41-2 to 41-5 hold the outputs ("H") of the former stage latches 41-1 to 41-4 and the first stage latch 41-1 holds the comparison result CMP ("L"). With this, the disaccord count value of the judgment unit 5 becomes "4". As a result, if the judgment threshold value is "5", the disaccord count value becomes less than the judgment threshold value, and the judgment unit 5 makes the output signal Y into "L".

In addition, by taking a fact that the fault detection apparatus in accordance with the present invention detects a malfunction of the input detection circuit that outputs a plurality of the input signals X1 to Xk which should originally be the identical signals by making the signals redundant for safety into consideration, even when the apparatus returns to the normal state after detecting an abnormality, the apparatus is preferable to hold the abnormality. Therefore, after outputting the output signal Y showing that an abnormality was detected, the judgment unit 5 can be made to hold the output signal Y without depending on the judgment result. In this situation, the judgment unit 5 can be made to change the output signal Y to a signal showing normal by a reset signal input from the outside.

Next, operation of the fault detection apparatus when the input signal X0 is not disaccord with the input signal X1 continuously for the filtering processing time is explained with reference to the timing chart in FIG. 4. In addition, the latches 41-1 to 41-5 before the clock time t0 hold the comparison result showing accord. Moreover, for the same operation as the operation explained with reference to the timing chart in FIG. 3, the detailed explanation is abbreviated.

At the clock times t0 and t1, both input signals X0 and X1 are "L", so the comparison unit 3 makes the comparison result into "L", the latches 41-2 to 41-5 hold the outputs (in this situation "L") of the latches 41-1 to 41-4, and the first stage latch 41-1 holds the comparison result CMP (in this situation "L"). Because all the outputs of the latches 41-2 to 41-5 are "L", the disaccord count value becomes "0", and the judgment unit 5 makes the output signal Y into "L" when the judgment threshold value is any one of "0", "3", and "5".

At the clock time t1a, because the input signal X0 changes from "L" to "H", the comparison unit 3 makes the comparison result into "H". At the clock time t2, the latches 41-2 to 41-5 hold the outputs (in this situation "L") of the latches 41-2 to 41-5 and the first stage latch 41-1 holds the comparison result CMP (in this situation "H"). With this, the disaccord count value becomes "1", and the judgment unit 5 makes and the output signal Y into "H" and holds the comparison result when the judgment threshold value is "0", and makes the output signal Y into "L" when the judgment threshold value is "3" or "5".

During the time from the clock time t1a to the clock time t3, input signals X0 and X1 do not change. The latches 41-2 to 41-5 hold the outputs of the latches 41-1 to 41-4 (in this situation, the latch 41-2 holds "H", and the latches 41-3 to 41-5 hold "L"), and the first stage latch 41-1 holds the comparison result CMP (in this situation "H"). With this, the disaccord count value of the judgment unit 5 becomes "2", and the judgment unit 5 holds the output signal Y at "H" when the judgment threshold value is "1", and makes the output signal Y into "L" when the judgment threshold value is "3" or "5".

At the clock time t3a, the input signal X1 changes from "L" to "H". With this, both the input signal X0 and the input signal X0 become "H". Therefore, the comparison unit makes the comparison result CMP into "L".

At the clock time t4, the latches 41-2 to 41-5 hold the outputs of the former stage latches 41-1 to 41-4 (in this situation, the latch 41-2 holds "H" and the latches 41-3 to 41-5 hold "L"), and the first stage latch 41-1 holds the comparison result CMP ("L"). Because the latch 41-1 has held "L", just as the sampling clock time t3, the disaccord count value of the judgment unit 5 becomes "2", and the judgment unit 5 holds the output signal Y at "H" when the judgment threshold value is "1", and makes the output signal Y into "L" when the judgment threshold value is "3" or "5".

At a clock time t4a, the input signal X1 changes from "H" to "L". With this, the input signal X0 and the input signal X1 have different values from each other. Therefore, the comparison unit 3 makes the comparison result CMP into "H".

At the clock time t5, the latches 41-2 to 41-5 hold the outputs of the former stage latches 41-1 to 41-4 (in this situation, the latches 41-2 and 41-5 hold "L", and the latches 41-3 and 41-4 hold "H"), and the first stage latch 41-1 holds the comparison result CMP ("H"). With this, the disaccord count value of the judgment unit 5 becomes "3", and the judgment unit 5 holds the output signal Y at "H" when the judgment threshold value is "1" or "3", and makes the output signal Y into "L" when the judgment threshold value is "5".

At a clock time t5a, the input signal X1 changes from "L" to "H". With this, both the input signal X0 and the input signal X1 become "H". Therefore, the comparison unit 3 makes the comparison result CMP into "L".

At the clock time t6, the latches 41-2 to 41-5 hold the outputs of the former stage latches 41-1 to 41-4 (in this situation, the latches 41-2, 41-4, and 41-5 hold "H", and the latch 41-3 holds "L"), and the first stage latch 41-1 holds the comparison result CMP ("L"). With this, the disaccord count value of the judgment unit 5 becomes "3", and the judgment unit 5 holds the output signal Y at "H" when the judgment threshold value is "1" or "3", and makes the output signal Y into "L" when the judgment threshold value is "5".

After the clock time t5a, the input signals X0 and X1 do not change. Therefore, during the time after the clock time t5a until only one of the input signals X0 and X1 does change, the comparison result CMP of the comparison unit remains "L". At a sampling clock time after the clock time t6, the latches 41-2 to 41-5 hold the outputs of the former stage latches 41-1 to 41-4, and the first stage latch 41-1 holds the comparison result CMP, which is "L". With this, at the clock time t8, the disaccord count value of the judgment unit 5 becomes "1", and at the clock time t10, the disaccord count value of the judgment unit 5 becomes "0".

As described above, according to the first embodiment of the present invention, the comparison unit 3 compares whether or not the polarities of a plurality of redundant input signals X0 to Xk are accord with each other, and the comparison-result storing unit 4 holds the comparison results at every sampling cycle set in the sampling-cycle setting unit 12, and the judgment unit 5 counts the number of the disaccord comparison results showing that the polarities of the input signals X0 to Xk are disaccord with each other among the comparison results of the number of samplings set in the order of temporal sequence in the sampling-count setting unit 11 from the latest comparison result, judges that the input signals X0 to Xk are abnormal if the count value is greater than or equal to the judgment threshold value set in the judgment-threshold-value setting unit 13, and judges that the input signals X0 to Xk are normal if the count value is less than the judgment threshold value, thereby enabling to judge normal or abnormal in accordance with the ratio of accord and disaccord of the comparison results of the number of samplings obtained in the order of temporal sequence from the latest comparison result. That is, normal or abnormal can be judged in accordance with the variations of input signals X0 to Xk of a predetermined "sampling cycle×number of samplings" time.

In addition, according to the present first embodiment, the number of samplings, the sampling cycle, and the judgment threshold value can be set to the sampling-count setting unit 11, the sampling-cycle setting unit 12, and the judgment-threshold-value setting unit 13, respectively from the outside, thereby enabling to change a number of the comparison results used in the judgment, a time to hold the comparison results, and a ratio of the numbers of accord and disaccord to judge normal or abnormal, and change a judgment criterion for normal or abnormal of the redundant input signals X0 and X1 in accordance with a system to apply the present apparatus.

Moreover, when counting the number of the disaccord comparison results showing that the polarities of the input signals X0 and X1 are disaccord with each other, weighted counting can be performed. The weighting is set, for example, by assuming that a signal waveform can be partially approximated by a polynomial curve, so as to depend on the order of the polynomial using a polynomial fitting technique that fits to this curve.

Figure 5:
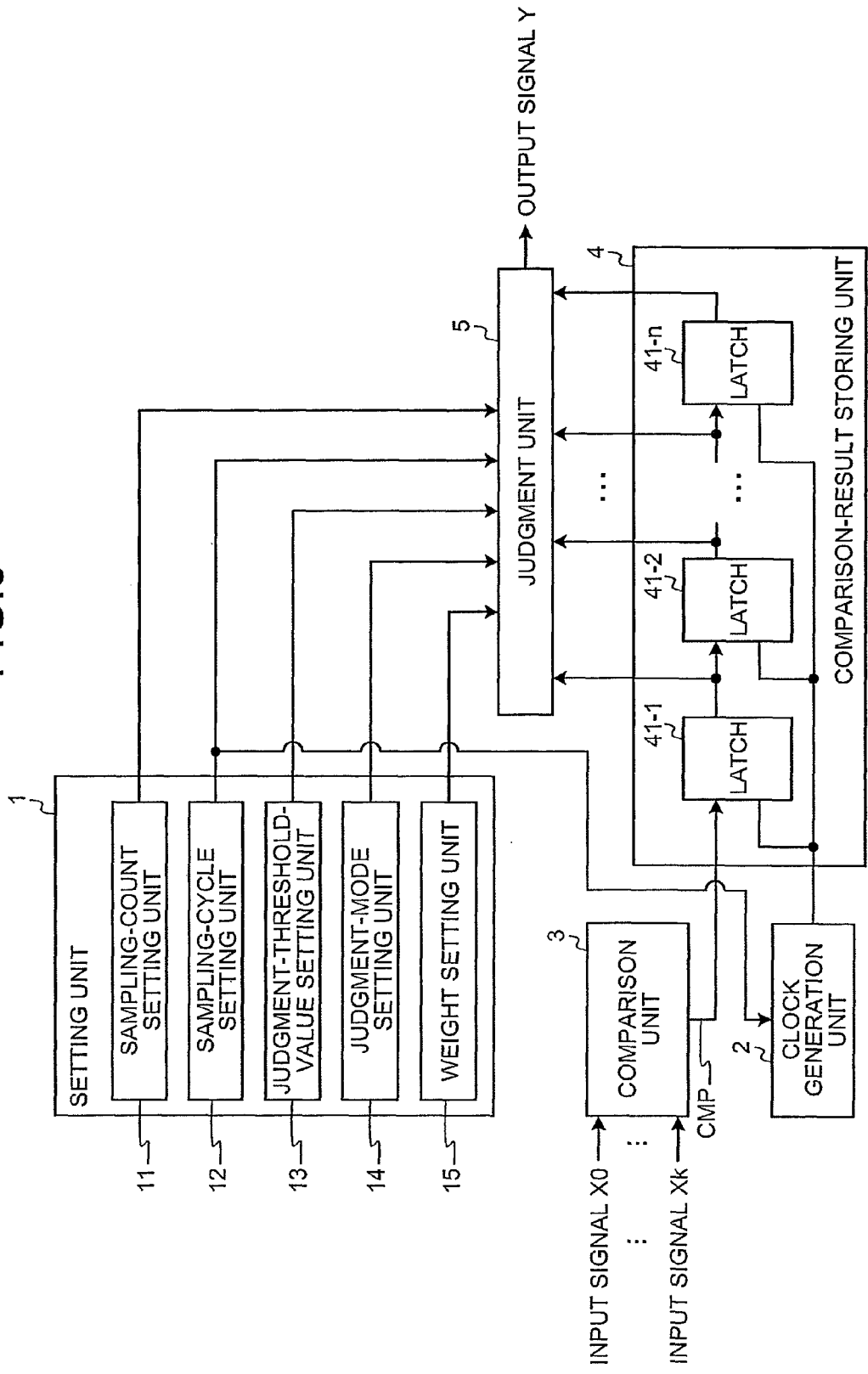
FIG. 5 is a block diagram illustrating a configuration of a fault detection apparatus when weighting is performed.

FIG. 5 is a block diagram illustrating a configuration of the fault detection apparatus when the weighted counting is performed. In the fault detection apparatus shown in FIG. 5, a judgment-mode setting unit 14 and a weight setting unit 15 is added to the setting unit 1 of the fault detection apparatus shown above in FIG. 2. In addition, the same letter or numeral is put for the same component to abbreviate the overlapped explanation.

The judgment-mode setting unit 14 is set to a mode for showing whether or not weighting is performed. The weight setting unit 15 is set to weightings (weight coefficients) in the order of temporal sequence from the present sampling cycle to the sampling cycle of the number of samplings. For example, let the number of samplings be "5", weight coefficients W1 to W5 corresponding to the latches 41-1 to 41-5 are set.

If the judgment-mode setting unit 14 is set to "without weighting mode" for showing that the weighting is not performed, the judgment unit 5, as described above, counts the disaccord comparison result showing that the polarities of the input signals X0 and X1 are disaccord with each other as "1", and judges normal or abnormal by comparing the count value with the judgment threshold value. If the judgment-mode setting unit 14 is set to "with weighting mode" for showing that the weighting is performed, the judgment unit 5 makes the disaccord comparison result into "1" showing that the polarities of the input signals X0 and X1 are disaccord with each other, counts the values of the comparison results by multiplying respective weight coefficients W1 to W5 corresponding to the latches 41-1 to 41-5 that hold these disaccord comparison results as the count value, and judges normal or abnormal by comparing the count value and the judgment threshold value.

As described above, by counting the values of the disaccord comparison results by multiplying the respective weighting coefficients to weight the comparison result for every sampling cycle in the order of temporal sequence, a more well-thought-out judgment can be performed compared with the situation in which all the comparison results are equally treated.

In addition, in the present first embodiment, although a comparison result showing that at least one polarity of the input signals X0 to Xk is disaccord with other is made to count to compare with the judgment threshold value, a comparison result showing that all the polarities of the input signals X0 to Xk are accord with each other can be made to count to compare with the judgment threshold value. In this situation, the judgment unit 5 has only to output the output signal Y showing normal if the count value is greater than or equal to the judgment threshold value, and output the output signal Y showing abnormal if the count value is less than the judgment threshold value.

Second Embodiment

A second embodiment of the present invention is explained with reference to FIGS. 6 and 7. The input signals to be input in the fault detection apparatus in accordance with the present invention are redundant signals that are generated when a plurality of switches provided in the input detection circuit to detect a fact that an input unit such as a push button, a lever, or a switch has been operated are turned on by the fact that the corresponding one input unit has been operated. Therefore, the input signals are analogue signals or digital signals converted from the analogue signals. When the input signals are analogue signals, in the comparison unit 3, each input analog signal is compared with a respective predetermined threshold value; if the input analog signal is greater than or equal to the threshold value, it is judged as "H", and if the input analog signal is less than the threshold value, it is judged as "L" to judge whether or not the respective input analog signals are accord with each other. In addition, When the input signals are digital signals, the input detection circuit compares each redundant analog signal with the respective predetermined threshold value; if the input analog signal is greater than or equal to the threshold value, it is made as "H", and if the input analog signal is less than the threshold value, it is made as "L" to output a digital signal. That is, even when converting the analog signals generated by a fact that a switch of either one of the input detection circuit or the comparison unit 3 has been turned on into the digital signals, "H" or "L" is determined by the comparison with the threshold value.

Figure 6:
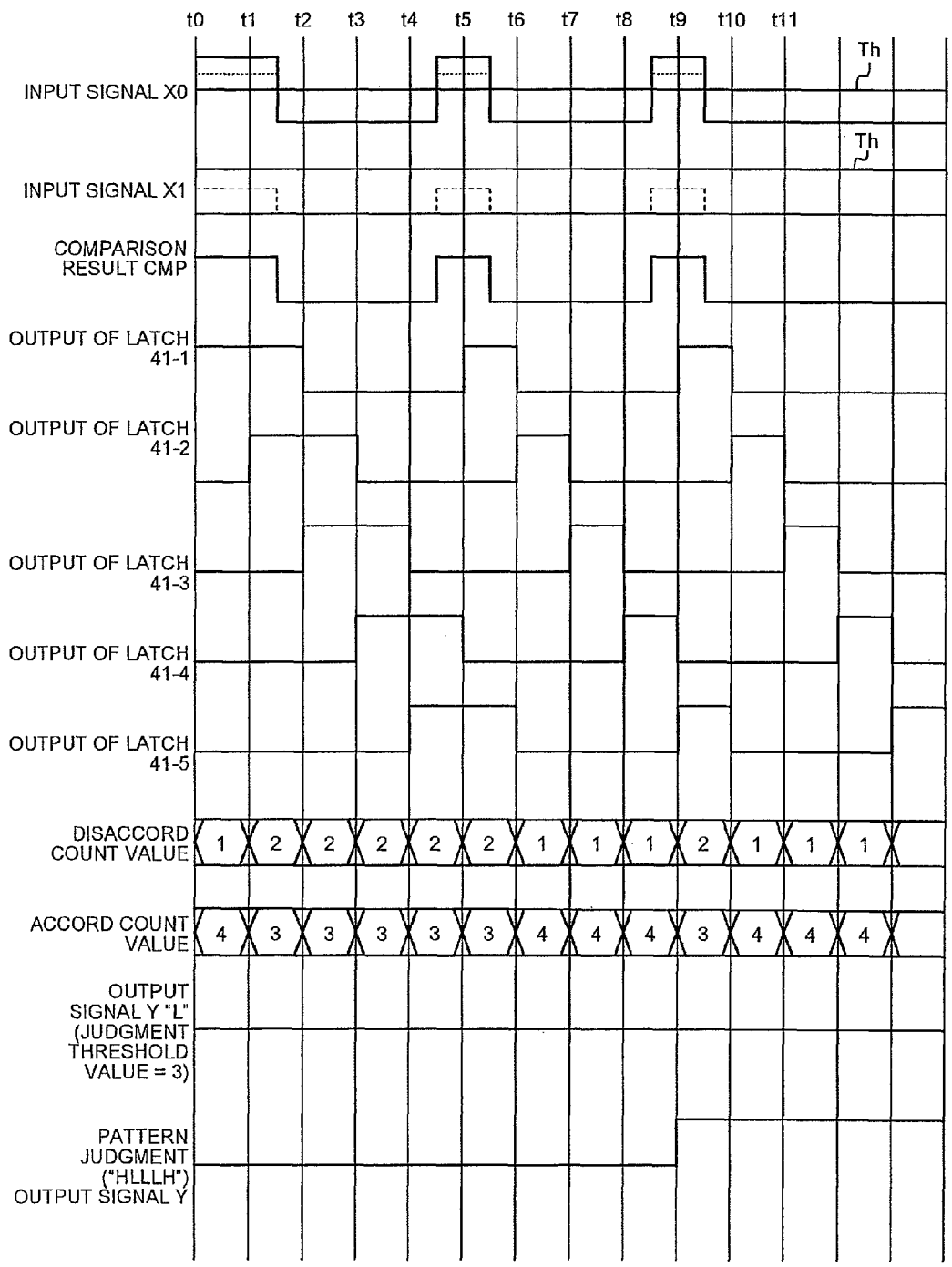
FIG. 6 is a timing chart illustrating an operation of a fault detection apparatus in accordance with a second embodiment of the present invention.

As shown in FIG. 6, if a threshold value that judges the input signals X0 and X1 as "H" or "L" is the threshold value Th, when the analogue signal corresponding to the input signal X0 is between the threshold value Th and the voltage showing "H" as shown in the dotted line, the input signal X0 becomes "H"; and when the analogue signal corresponding to the input signal X1 is between the threshold value Th and the voltage showing "L" as shown in the broken line, the input signal X1 becomes "L". With this, in FIG. 6, at the clock times, which are sampling cycles, t0, t1, t5, and t9, the comparison unit 3 outputs a comparison result showing that the input signals X0 and X1 are disaccord with each other, and at the clock times t2, t3, t4, t6, t7, t8, t10, and t11, the comparison unit 3 outputs a comparison result showing that the input signals X0 and X1 are accord with each other. Therefore, under the conditions of the number of samplings: "5", judgment threshold value: "3", and "without weighting mode", the count value of the disaccord counter becomes "1" at the clock times t0, t6, t7, t8, t10, and t11, the count value of the disaccord counter becomes "2" at the clock times t1, t2, t3, t4, t5, and t9, and the judgment unit 5 outputs the output signal Y (in this situation "L") showing normal.

However, both analogue signals that become the sources of the input signals X0 and X1 are in an unstable state, and the state continues periodically; when taking a fact that these analogue signals are for detecting a malfunction of the input detection circuit that outputs a plurality of input signals X1 to Xk that should originally be the same signals and are made redundant for safety into consideration, it is preferable that such an unstable state and a periodic disaccord of the analogue signals can be detected.

For example, if the judgment threshold value is made small, when counting the disaccord comparison result, for example, by making the judgment threshold value as "1" so that the accord of all values is made normal, an abnormality can also be detected in the input signals X0 and X1 as shown in FIG. 6. However, when the judgment threshold value is made "1", even if there is one disaccord by a delay of signal due to the property of a switch or noise, whenever an abnormality is detected, the system must be stopped at each time, so the merit of judgment that uses the comparison result at every sample cycle cannot be fully utilized.

In order to improve such a problem, in the present second embodiment, normal or abnormal of the redundant input signals is judged not by the judgment using the threshold value but by a pattern of the comparison result at every sampling cycle.

Figure 7:
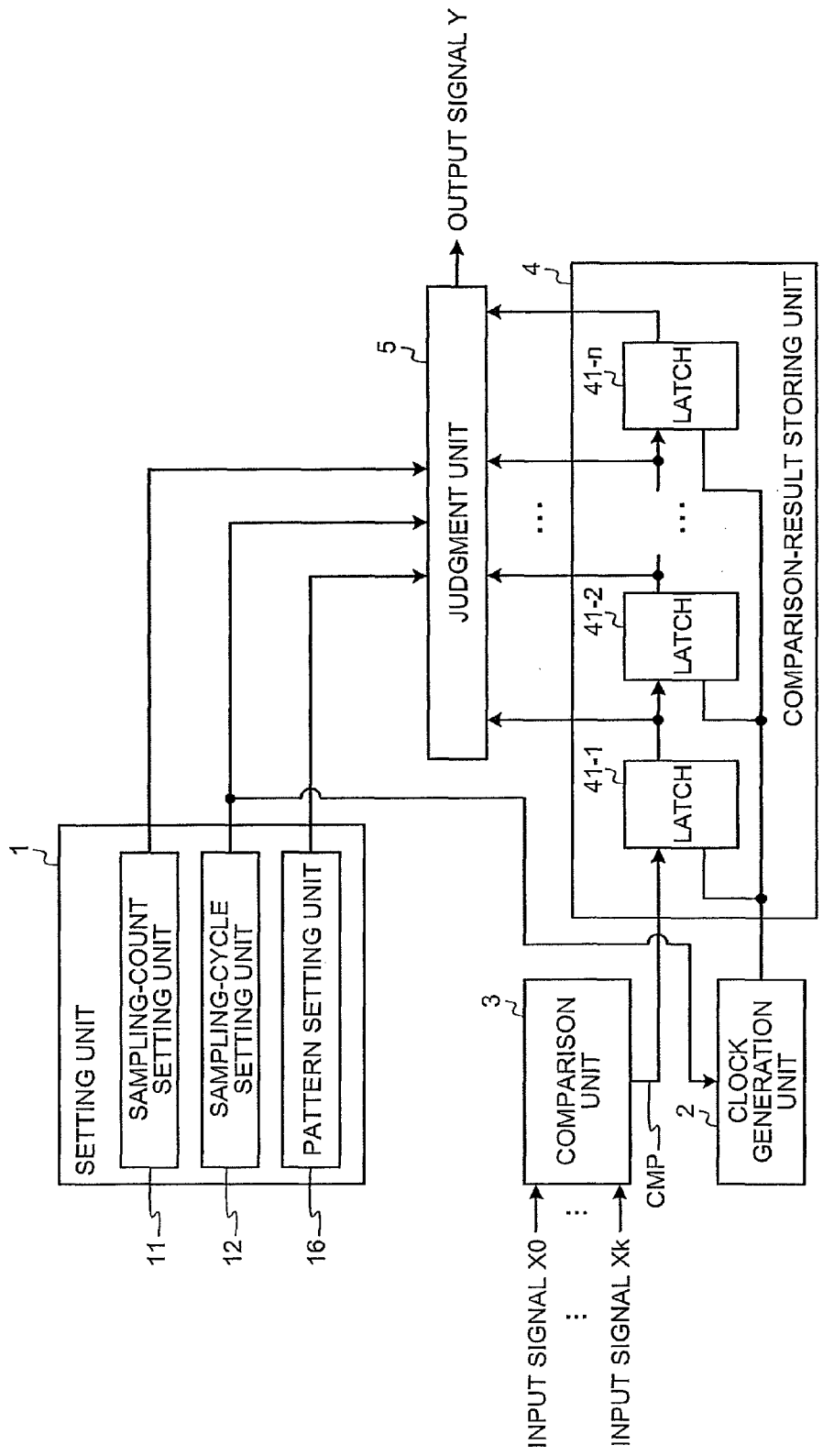
FIG. 7 is a block diagram illustrating a configuration of a fault detection apparatus in accordance with the second embodiment of the present invention.

FIG. 7 is a block diagram illustrating a configuration of the fault detection apparatus in accordance with the second embodiment of the present invention. In the fault detection apparatus in accordance with the second embodiment shown in FIG. 7, the judgment-threshold-value setting unit 13 is deleted from the setting unit 1 of the fault detection apparatus in accordance with the first embodiment shown above in FIG. 2, and a pattern setting unit 16 is added as a substitute for the judgment-threshold-value setting unit 13. For the same component having the same function as in the fault detection apparatus in accordance with the first embodiment shown above in FIG. 2, the same letter or numeral is put to abbreviate the overlapped explanation.

In the pattern setting unit 16, judgment patterns of the number of samplings from the present sampling cycle to the sampling cycle of the number of samplings in the order of temporal sequence showing accord or disaccord are set. Specifically, for example, if the number of samplings is "5", judgment patterns corresponding to the latches 41-1 to 41-5 are recorded. In addition, a plurality of judgment patterns can be existed.

The judgment unit 5 compares the pattern of the comparison result from the present sampling cycle to the sampling cycle of the number of samplings in the order of temporal sequence with the judgment pattern recorded in the pattern setting unit 16, if the pattern of the comparison result is accord with the judgment pattern, judges as abnormal, and if the pattern of the comparison result is disaccord with the judgment pattern, judges as normal. In addition, if a plurality of judgment patterns are recorded in the pattern setting unit 16, when the pattern of the comparison result is accord with at least one judgment pattern, the judgment unit 5 has only to judge abnormal.

Next, the operation of the fault detection apparatus in accordance with the present second embodiment is explained by citing a situation when the number of input signals is "2" (k=2), the sampling cycle is "T", the number of samplings is "5", and the judgment pattern is "disaccord, accord, accord, accord, and disaccord ("HLLLH")" as an example. In addition, a point of difference between the fault detection apparatus in accordance with the present second embodiment and the aforementioned fault detection apparatus in accordance with the first embodiment is only a judgment operation of the judgment unit 5; and the operations of the comparison unit 3, the clock generation unit 2, and the comparison result storing unit 4 are the same, the detailed explanations of the operations as the same as those of the first embodiment are abbreviated.

At the clock time t0, because the input signal X0 is "H" and the input signal X1 is "L", the comparison unit 3 makes the comparison result CMP into a comparison result (in this case "H") showing that the input signal X0 is disaccord with the input signal X1, and the latch 41-1 holds "H" and the latches 41-2 to 41-5 hold "L". With this, the pattern of the comparison result of the latches 41-1 to 41-5 becomes "HLLLL" in temporal sequence. The judgment unit 5 compares the judgment pattern "HLLLH" set in the pattern setting unit 16 with the temporal sequence pattern "HLLLL". Because the result of the comparison is disaccord, the judgment unit 5 makes the output signal Y into "L" showing normal.

At the clock time t1, because the input signal X0 is disaccord with the input signal X1 just as at the clock time t0, the comparison unit 3 makes the comparison result CMP into "H", the latches 41-1 and 41-2 hold "H", and the latches 41-3 to 41-5 hold "L". With this, the pattern of the comparison result of the latches 41-1 to 41-5 becomes "HHLLL" in temporal sequence and is disaccord with the judgment pattern "HLLLH", so the judgment unit 5 makes the output signal Y into "L".

At the clock time t2, because both the input signals X0 and X1 are "L", the comparison unit 3 makes the comparison result into a comparison result (in this case "L") showing that the input signal X0 is accord with the input signal X1, the latches 41-1, 41-4, and 41-5 hold "L", and the latches 41-2 and 41-3 hold "H". With this, the pattern of the comparison result of the latches 41-1 to 41-5 becomes "LHHLL" in temporal sequence and is disaccord with the judgment pattern "HLLLH", so the judgment unit 5 makes the output signal Y into "L".

At the clock time t3, because both the input signals X0 and X1 are "L", the comparison unit 3 makes the comparison result into "L", the latches 41-1, 41-2, and 41-5 hold "L", and the latches 41-3 and 41-4 hold "H". With this, the pattern of the comparison result of the latches 41-1 to 41-5 becomes "LLHHL" in temporal sequence and is disaccord with the judgment pattern "HLLLH", so the judgment unit 5 makes the output signal Y into "L".

At the clock time t4, because both the input signals X0 and X1 are "L", the comparison unit 3 makes the comparison result into "L", the latches 41-1 to 41-3 hold "L", and the latches 41-4 and 41-5 hold "H". With this, the pattern of the comparison result of the latches 41-1 to 41-5 becomes "LLLHH" in temporal sequence and is disaccord with the judgment pattern "HLLLH", so the judgment unit 5 makes the output signal Y into "L".

At the clock time t5, because the input signal X0 is "H" and the input signal X1 are "L", the comparison unit 3 makes the comparison result into "H", the latches 41-1 and 41-5 hold "H", and the latches 41-2 to 41-4 hold "L". With this, the pattern of the comparison result of the latches 41-1 to 41-5 becomes "HLLLH" in temporal sequence and is accord with the judgment pattern "HLLLH", so the judgment unit 5 makes the output signal into "H" showing abnormal.

As described above, in the present second embodiment, the comparison unit 3 compares whether or not the polarities of a plurality of redundant input signals X0 and X1 are accord with each other, the comparison-result storing unit 4 holds the comparison results of the comparison unit 3 at every sampling cycle that is set in the sampling-cycle setting unit 12, and the judgment unit 5 compares the order or disorder pattern that is arranged in the order of temporal sequence from the comparison result of the present sampling cycle to the comparison results of the sampling cycles of the number of samplings, which are set in the sampling-count setting unit 11 from the present sampling cycle to the sampling cycles of the number of samplings in the order of temporal sequence, with the judgment pattern that is set in the pattern setting unit 16 of the setting unit. If the accord/disaccord pattern accords with the judgment pattern, the judgment unit 5 judges as abnormal, and if the accord/disaccord pattern disaccords with the judgment pattern, the judgment unit 5 judges as normal, so the judgment unit 5 can judge normal or abnormal in accordance with the variation of the input signals X0 and X1 of a predetermined amount of time of "sampling cycle×number of samplings", and also can detect the abnormality of the input signals X0 and X1, which is unable to detect using the threshold value judgment.

In addition, in the present second embodiment, when a pattern that arranges the comparison results held by the latches 41-1 to 41-5 in the order of temporal sequence is accord with the judgment pattern, the judgment unit judges as abnormal; and when the pattern that arranges the comparison results held by the latches 41-1 to 41-5 in the order of temporal sequence is disaccord with the judgment pattern, the judgment unit judges as normal; however, when the pattern that arranges the comparison results held by the latches 41-1 to 41-5 in the order of temporal sequence is accord with the judgment pattern, the judgment unit can judge as normal; and when the pattern that arranges the comparison results held by the latches 41-1 to 41-5 in the order of temporal sequence is disaccord with the judgment pattern, the judgment unit can judge as abnormal. Moreover, if the judgment unit judges as normal when the pattern is accord with the judgment pattern, the number of judgment patterns is considered to become large, so it is preferable to use this judgment method by combing the threshold value judgment explained above in the first embodiment. For example, even when the judgment unit judges as abnormal by the threshold value judgment, if the pattern is accord with the judgment pattern, that is, if the pattern is a specified pattern, the judgment unit judges as normal.

Figure 8:
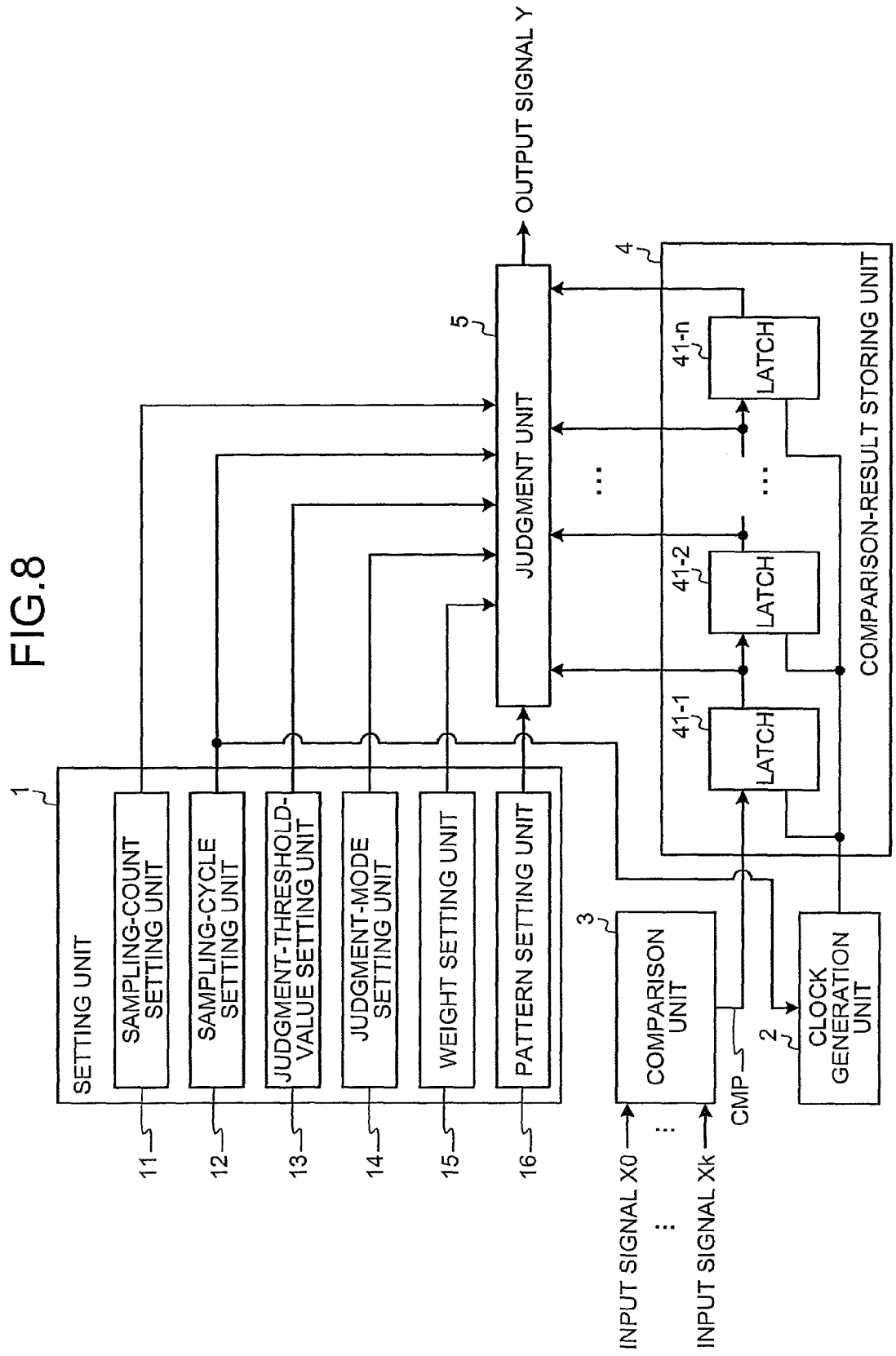
FIG. 8 is a block diagram illustrating a configuration of a fault detection apparatus when a user selects a judgment from a judgment by a judgment threshold value and a judgment by a judgment pattern.

FIG. 8 is a block diagram illustrating a configuration of a fault detection apparatus when a user selects a judgment from a judgment by the judgment threshold value and a judgment by the judgment pattern. In the fault detection apparatus shown in FIG. 8, the pattern setting unit 16 in accordance with the second embodiment is added to the setting unit of the fault detection apparatus shown above in FIG. 5.

FIG. 9 is a list showing a judgment condition and with or without weighting that are set in the judgment-mode setting unit 14 in the fault detection apparatus shown in FIG. 8. If the mode (without weighting) for performing the threshold value judgment is set in the judgment-mode setting unit 14, as explained above in the first embodiment, the judgment unit 5 judges normal or abnormal by counting the number of the comparison results showing disaccord or the number of the comparison results showing accord among the comparison results of the latches 41, and comparing the count value with the judgment threshold value that is set in the judgment-threshold-value setting unit 13.

If the mode (with weighting) for performing the threshold value judgment is set in the judgment-mode setting unit 14 as explained above in the first embodiment, the judgment unit 5 judges normal or abnormal by making the comparison results showing disaccord or the comparison results showing accord as "1", counting the values of these results by multiplying the respective weightings coefficients that are set in the weight setting unit 15 in accordance with the latches 41, and comparing the count value with the judgment threshold value that is set in the judgment-threshold-value setting unit 13.

When the judgment-mode setting unit 14 is set to a mode for performing the pattern judgment, as explained in the present second embodiment, the judgment unit 5 judges normal or abnormal by comparing the pattern in which the comparison results of the latches 41 are arranged in the order of temporal sequence with the judgment pattern that is set in the pattern setting unit 16.

When the judgment-mode setting unit 14 is set to a mode for performing the threshold value judgment (with or without weighting) or the pattern judgment, the judgment unit 5 judges normal or abnormal by performing the threshold value judgment (with or without weighting) and the pattern judgment, and if either one judgment result becomes abnormal, the judgment unit 5 judges as abnormal.

When the judgment-mode setting unit 14 is set to a mode for performing the threshold value judgment (with or without weighting) and the pattern judgment, the judgment unit 5 judges normal or abnormal by performing the threshold value judgment (with or without weighting) and the pattern judgment, and if both judgment results become abnormal, the judgment unit 5 judges as abnormal.

Third Embodiment

A third embodiment of the present invention is explained with reference to FIGS. 10 to 12. In the first embodiment discussed above, because the comparison results of the input signals X0 to Xk judged by the comparison unit 3 are made to be memorized in the comparison-result storing unit 4 that configures a shift register using the latches 41, latches of the number of samplings are required. For this reason, there is a problem that as the number of samplings increases, the number of latches increases and the resource grows too large.

In order to improve such a problem, in the present third embodiment, the comparison-result storing unit configures a first comparison-result storing unit that memorize the comparison results in the order of temporal sequence and a second comparison-result storing unit that memorize the count value of the comparison results (disaccord or accord) that are used for judgment to suppress the resource from increasing even when the number of samplings is large.

Figure 10:
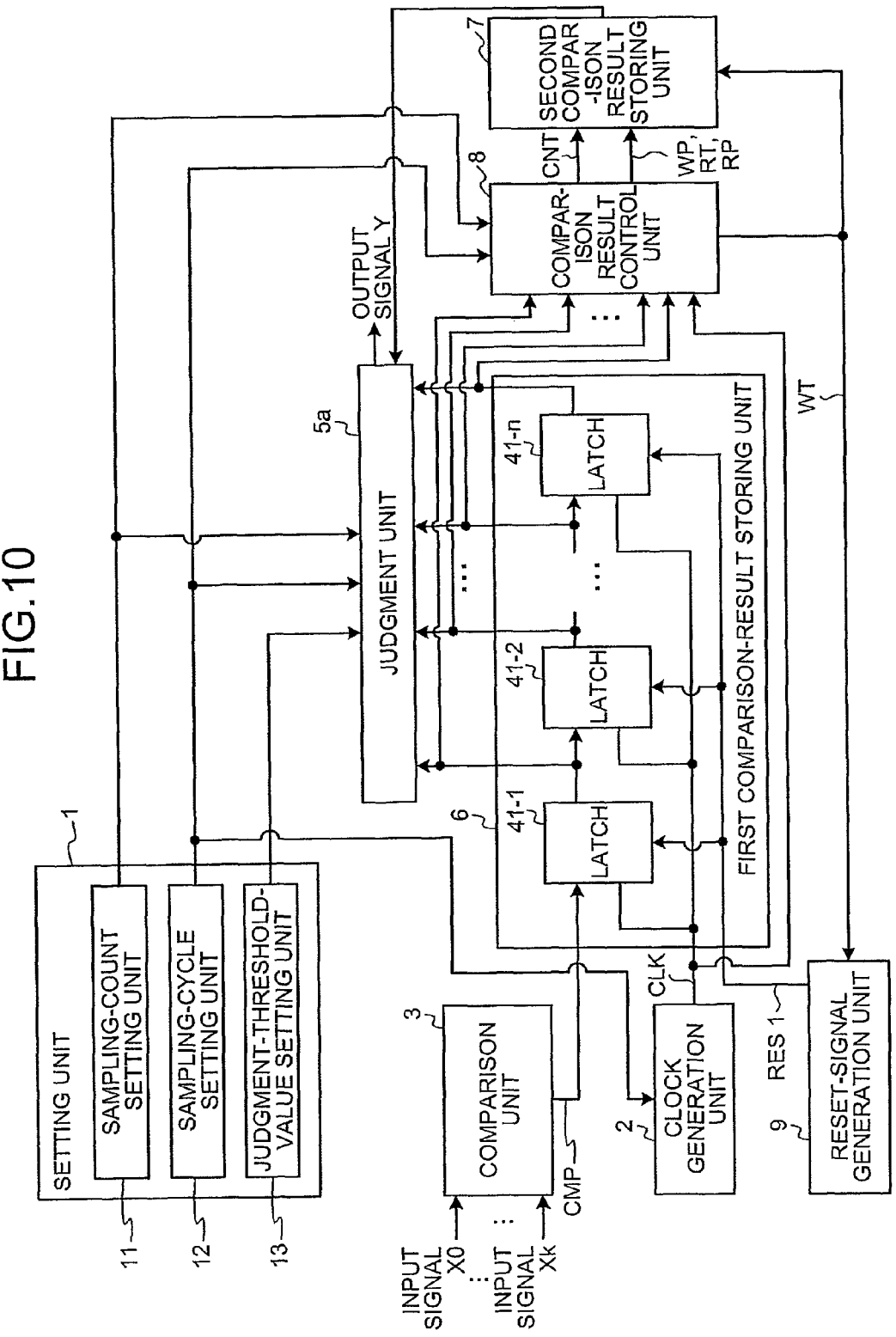
FIG. 10 is a block diagram illustrating a configuration of a fault detection apparatus in accordance with a third embodiment of the present invention.

FIG. 10 is a block diagram illustrating a configuration of the fault detection apparatus in accordance with a third embodiment of the present invention. In the fault detection apparatus in accordance with the third embodiment shown in FIG. 10, a judgment unit 5a is provided as a substitute for the judgment unit 5 of the fault detection apparatus in accordance with the first embodiment shown above in FIG. 2, and a second comparison-result storing unit 7, a comparison-result control unit 8, and a reset-signal generation unit 9 are added. For the same component having the same function as in the fault detection apparatus in accordance with the first embodiment shown above in FIG. 2, the same letter or numeral is put to abbreviate the overlapped explanation. In addition, the configuration and the function of a first comparison-result storing unit 6 shown in FIG. 10 are the same as those of the comparison-result storing unit 4 shown above in FIG. 2.

The second comparison-result storing unit 7 holds m (m: natural values) count values of the comparison results showing disaccord at maximum among the number of disaccord or accord of n comparison results from the present clock time to before "n×sampling cycle" at every "n×sampling cycle", that is, the comparison results that the latches 41-1 to 41-n of the first comparison-result storing unit 6 holds.

Figure 11:
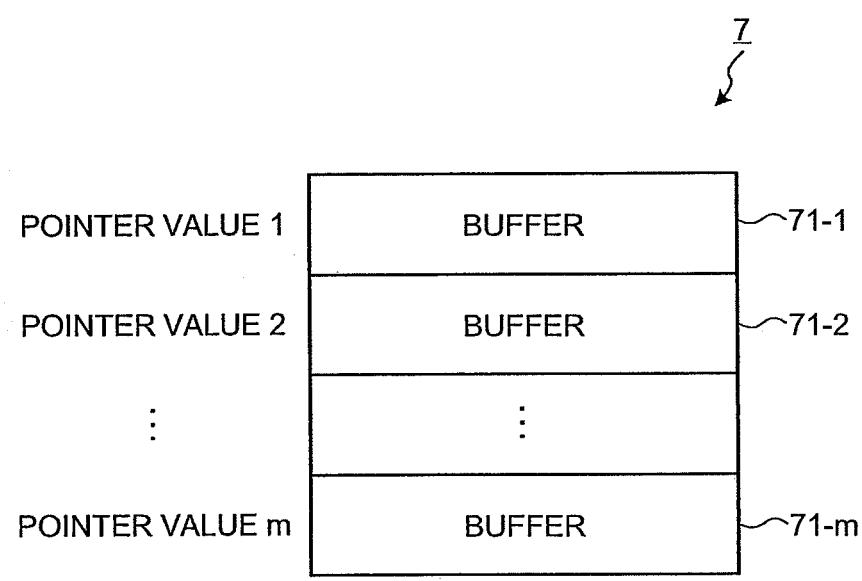
FIG. 11 is a diagram illustrating an example of a configuration of a second comparison-result storing unit shown in FIG. 10.

FIG. 11 is a diagram illustrating an example of the configuration of the second comparison-result storing unit 7 shown in FIG. 10. In FIG. 11, the second comparison-result storing unit 7 configures a typical ring buffer in which m buffers 71 (representing 71-1 to 71-m) are specified by a pointer value; where, the pointer 1 specifies the buffer 71-1, the pointer 2 specifies the buffer 71-2, . . . , and the pointer m specifies the buffer 71-m.

Returning to FIG. 10, the comparison-result control unit 8 controls the writing of the count value of the comparison result into the second comparison-result storing unit 7 and the reading of the count value of the comparison result from the second comparison-result storing unit 7.

For example, if the second comparison-result storing unit 7 configures the ring buffer shown above in FIG. 11, the comparison-result control unit 8 obtains the write cycle to memorize the count values of the comparison results into the required number of the buffers 71 and the second comparison-result storing unit 7 based on the number of samplings that is set in the sampling-count setting unit 11, the sampling cycle that is set in the sampling-cycle setting unit 12, and the number of the latches 41 of the first comparison-result storing unit 6 when an initial operation is executed at turning on or resetting the apparatus thereof.

The number of necessary buffers 71 h (h≤m, h: natural number) can be obtained by $$h = (L-n)/n \qquad \text{(Equation 1)}$$

where n is the number of the latches 41 of the first comparison-result storing unit 6 and L is the number of samplings.

The write cycle Tw can be obtained by $$Tw = n \times T \qquad \text{(Equation 2)}$$

Where n is the number of the latches 41 of the first comparison-result storing unit 6 and T is the sampling cycle.

The comparison-result control unit 8 generates control signals (such as a write signal WT, a write pointer value WP, a read signal RT, and a read pointer value RP) of the second comparison-result storing unit 7 and outputs the generated control signals to the second comparison-result storing unit 7 based on the number of necessary buffers (hereinafter, called number of effective buffers) and the write cycle obtained by (Equation 1) and (Equation 2) described above, respectively, and the sampling CLK of the sampling cycle generated by the clock generation unit 2. In addition, the comparison-result control unit 8 outputs the write signal WT, which is one of the control signals, to the reset-signal generation unit 9.

More specifically, the comparison-result control unit 8 outputs the write signal WT and the pointer value WP at every write cycle Tw. In addition, the comparison-result control unit 8 outputs the read signal RT and the read pointer value RP to the second comparison-result storing unit 7 at every read cycle Tr that becomes equal to the sampling cycle T to output the values that the buffers 71 to the judgment unit 5a.

The judgment unit 5a obtains the number of the comparison results showing disaccord among the comparison results within the time from the present clock time to before "number of samplings×sampling cycle" based on the comparison results input from the latches 41 and the values input from the second comparison-result storing unit 7, and performs the threshold value judgment processing for judging normal or abnormal of the input signals X0 to Xk based on the obtained values, the number of samplings that is set in the sampling-count setting unit 11, and the judgment threshold value that is set in the judgment-threshold-value setting unit 13.

Specifically, the judgment unit 5a performs the threshold value judgment processing for judging normal or abnormal of the input signals X0 to Xk based on the counting function to count the number of comparison results showing that at least one of the input signals X0 to Xk is disaccord with other among the comparison results that are input from the latches 41, the obtained value by this counting function, the number of samplings that is set in the sampling-count setting unit 11, and the judgment threshold value that is set in the judgment-threshold-value setting unit 13.

More specifically, by using the counting function, the judgment unit 5a counts the number of the comparison results showing disaccord among n comparison results from the first stage latch 41-1 to the last stage latch 41-n, that is, from the time of the present sampling cycle to the time of "number of latches 41 n×sampling cycle", and make this count value as the disaccord count value of the first comparison-result storing unit 6.

By using an addition function, the judgment unit 5a adds the disaccord count value of the first comparison-result storing unit 6 counted by the counting function and the disaccord count value held by the second comparison-result storing unit 7, that is, the value written in the buffers 71 from the buffers 71 in which the latest value is written to before the number of the effective buffers h to obtain the count value (total disaccord value) showing disaccord among the comparison results of the number of samplings.

The judgment unit 5a compares the total disaccord value obtained by the addition function with the judgment threshold value, judges abnormal when the total disaccord value is greater than or equal to the judgment threshold value, and judges normal when the total disaccord value is less than the judgment threshold value. The judgment unit 5a outputs the judgment result as the output signal Y. In addition, the judgment unit 5a outputs the disaccord count value CNT of the first comparison-result storing unit 6 obtained using the addition function to the second comparison-result storing unit 7.

After the disaccord count value CNT of the first comparison-result storing unit 6 is held by the comparison-result control unit 8, the reset-signal generation unit 9 outputs a reset signal RES1 to the latches 41 to reset the values of the latches 41. In this situation, the values that the latches 41 hold are made to values that the comparison results show accord.

Figure 12:
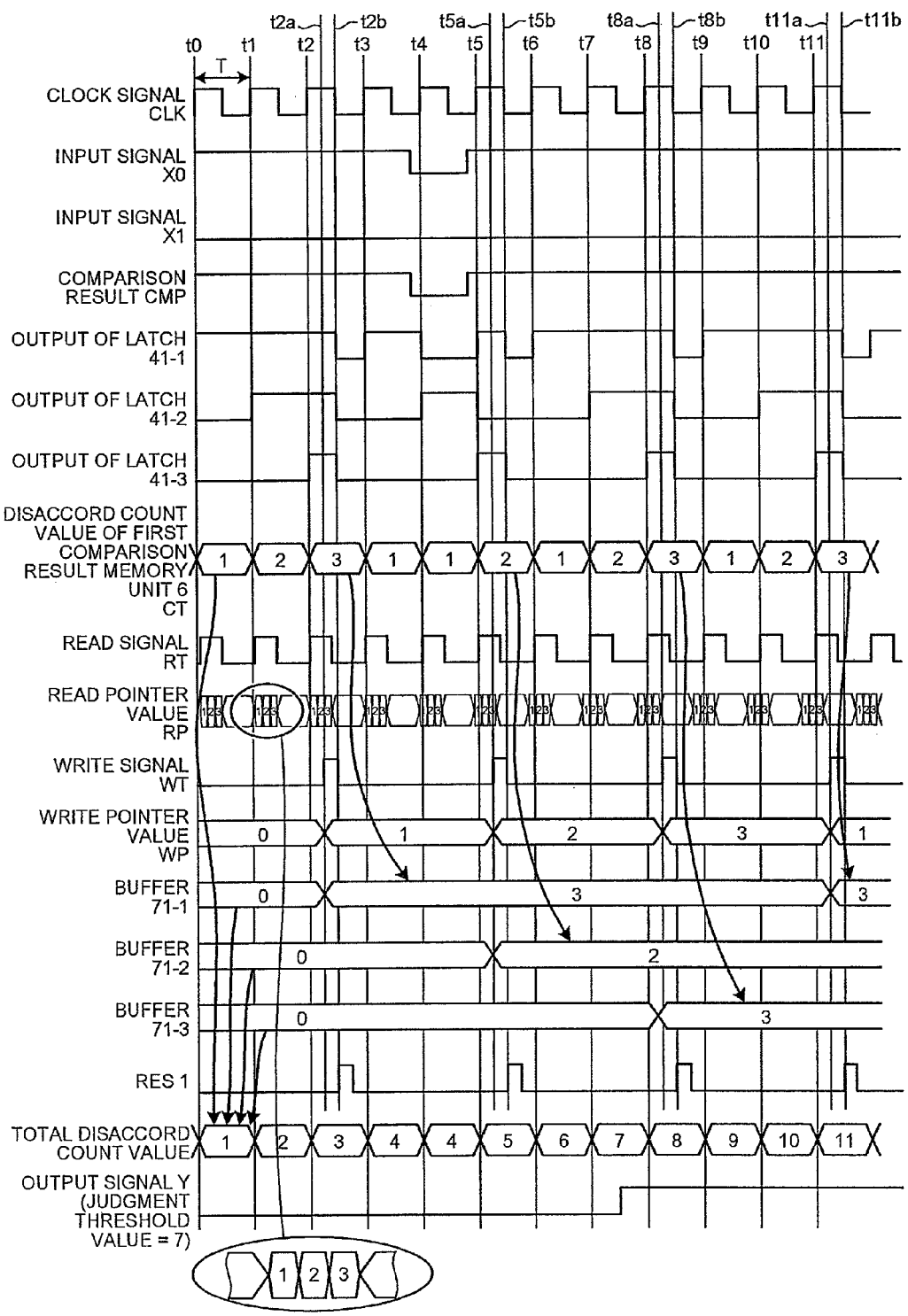
FIG. 12 is a timing chart illustrating an operation of a fault detection apparatus in accordance with the third embodiment of the present invention.

Operation of the fault detection apparatus in accordance with the present invention is explained by citing an example when the number of input signals is "2" (k=2), the number of the latches 41 is "3" (n=3), the sampling cycle is "T", and the number of samplings is "12" with reference to timing chart in FIG. 12, and FIGS. 10 and 11.

In FIG. 12, because the number of the latches 41 is "3" and the number of samplings is "12", by using (Equation 1) and (Equation 2) described above, the number of effective buffers h becomes "3" and the write cycle Tw becomes "3T". In addition, the read cycle Tr becomes "T".

At the clock time t0, the comparison unit 3 outputs the comparison result CMP between the input signals X0 and X1. Because here, the input signal X0 is "H" and the input signal X1 is "L", the comparison unit 3 makes the comparison result CMP into the comparison result (in this situation "H") showing that the input signal X0 is disaccord with the input signal X1. The latches 41-2 and 41-3 hold the outputs of the former stage latches 41-1 and 41-2, and the first stage latch 41-1 holds the comparison result CMP. In this situation, the latch 41-1 holds "H", and the latches 41-2 and 41-3 hold "L".

On the other hand, the comparison-result control unit 8 makes the read signal RT into assert (in this situation "H"), outputs the values that the buffers 71-1 to 71-3 hold (in this situation all "0") to the judgment unit 5a by making the read pointers as "1", "2", and "3", and then makes the read signal RT into negate (in this situation "L").

The judgment unit 5a judges whether or not the outputs of the latches 41-1 to 41-3 are the comparison results showing disaccord (in this situation "H") and counts the number of the comparison results showing disaccord. Because here, the output of the latch 41-1 is "H" and the outputs of the latches 41-2 and 41-3 are "L", the number of the comparison results showing disaccord (the disaccord count value CNT of the first comparison-result storing unit 6) is "1".

The judgment unit 5a obtains the total disaccord count value by adding the values input from the buffers 71-1 to 71-3 to the disaccord count value CNT of the first comparison-result storing unit 6. Because here, the disaccord count value of the first comparison-result storing unit 6 is "1" and the values input from the buffers 71-1 to 71-3 are all "0", the total disaccord count value becomes "1". In addition, because here, the judgment threshold value is "7", the judgment unit 5a makes the output signal Y into "L" showing normal.

Henceforth, a series of operations at the clock time t0 described above, that is, a first comparison result memory processing operation that the latches 41-2 and 41-3 hold the outputs of the former stage latches 41-1 and 41-2 and the latch 41-1 holds the comparison result COM, a second comparison result output processing operation that the comparison-result control unit 8 controls the buffers 71-1 to 71-3 to output the values that the buffers 71-1 to 71-3 hold to the judgment unit 5a, and together with a judgment processing operation that the judgment unit 5a obtains the disaccord count value of the first comparison-result storing unit 6, obtains the total disaccord count value by adding the obtained disaccord count value of the first comparison-result storing unit 6 and the values input from the buffers 71-1 to 71-3, compares the total disaccord count value with the judgment threshold value, and outputs the output signal Y, is sometimes called as a within-write-cycle processing operation. This within-write-cycle processing operation is executed at every sampling clock time.

At the clock time t1, since it is not a sampling period that matches the write cycle into the buffers 71 of the second comparison-result storing unit 7, only the within-write-cycle processing operation is performed just as at the clock time t0. Because here, the input signal X0 is "H" and the input signal X1 is "L", the comparison unit 3 makes the comparison result CMP into "H", and with the first comparison result memory processing operation, the latches 41-1 and 41-2 hold "H" and the latch 41-3 holds "L". In addition, with the second comparison result output processing operation, the comparison-result control unit 8 makes the values (in this situation all "0") that the buffers 71-1 to 71-3 hold output to the judgment unit 5*a*. Furthermore, with the judgment processing operation, the judgment unit 5*a* obtains the disaccord count value (in this situation "2") of the first comparison-result storing unit 6 and the total disaccord count value (in this situation "2"), and outputs the output signal Y (in this situation "L").

At the clock time t2, since it is a sampling period that matches the write cycle into the buffers 71 of the second comparison-result storing unit 7, after performing the within-write-cycle processing operation, the write processing into the buffers 71, which is the second comparison-result storing unit 7, is performed. First, at the clock time t2, the within-write-cycle processing operation is performed just as at the clock times t0 and t1.

Because here, the input signal X0 is "H" and the input signal X1 is "L", the comparison unit 3 makes the comparison result CMP into "H", and the latches 41-1 to 41-3 hold "H" with the first comparison result memory processing operation. In addition, with the second comparison result output processing operation, the comparison-result control unit 8 makes the values (in this situation all "0") that the buffers 71-1 to 71-3 hold output to the judgment unit 5*a*. Furthermore, with the judgment processing operation, the judgment unit 5*a* obtains the disaccord count value CNT (in this situation "3") of the first comparison-result storing unit 6 and the total disaccord count value (in this situation "3"), and outputs the output signal Y (in this situation "L"). Also, the judgment unit 5*a* outputs the disaccord count value CNT (in this situation "3") of the first comparison-result storing unit 6 to the second comparison-result storing unit 7.

At the clock time t2*a* after finishing the within-write-cycle processing operation in the sampling clock times starting from the clock time t2, the comparison-result control unit 8 controls the write signal WT and the write pointer value WP to make the buffers 71 of the second comparison-result storing unit 7 hold the disaccord count value CNT of the first comparison-result storing unit 6.

The comparison-result control unit 8, here, makes the write signal WT into assert (in this situation "H"), the write pointer into "1", and the buffers 71 hold the disaccord count value CNT (in this situation "3"). At the clock time t2*b* when the buffers 71 have held the disaccord count value CNT of the first comparison-result storing unit 6, the comparison-result control unit 8 makes the write signal WT into negate (in this situation "L").

With the fact that the write signal WT has become negate at the clock time t2*b*, when it is acknowledged that the buffers 71-1 hold the disaccord count value CNT of the first comparison-result storing unit 6, the reset-signal generation unit 9 makes the reset signal RES1 into assert (in this situation "H"). With this, after the outputs of the latches 41-1 to 41-3 become "L", the reset-signal generation unit 9 makes the reset signal RES1 into negate (in this situation "L").

Henceforth, a series of operations from the clock time t2*a* to the clock time t2*b*, that is, a second comparison result memory processing operation that the comparison-result control unit 8 controls the write signal WT and the write pointer value WP to make the buffers 71 that the write pointer value WP specifies hold the disaccord count value CNT of the first comparison-result storing unit 6, and together with a first comparison result reset processing operation that the reset-signal generation unit 9 resets the values of the latches 41-1 to 41-3, is sometimes called a write cycle processing operation.

At the clock times t3 and t4, since it is not a sampling period that matches the write cycle into the buffers 71 of the second comparison-result storing unit 7, only the within-write-cycle processing operation is performed just as at the clock time t0.

At the clock time t3, because the input signal X0 is "H" and the input signal X1 is "L", the comparison unit 3 makes the comparison result CMP into "H", and the latch 41-1 holds "H" and the latches 41-2 and 41-3 hold "L" with the first comparison result memory processing operation. In addition, with the second comparison result output processing operation, the comparison-result control unit 8 makes the values (in this situation, the buffer 71-1 is "3" and the buffers 71-2 and 71-3 are "0") that the buffers 71-1 to 71-3 hold output to the judgment unit 5*a*. Furthermore, with the judgment processing operation, the judgment unit 5*a* obtains the disaccord count value (in this situation "1") of the first comparison-result storing unit 6 and the total disaccord count value (in this situation "4"), and outputs the output signal Y (in this situation "L").

In addition, because both the input signals X0 and X1 are "L", the comparison unit 3 makes the comparison result CMP into "H", and the latch 41-1 and 41-3 hold "L" and the latch 41-2 holds "H" with the first comparison result memory processing operation. In addition, with the second comparison result output processing operation, the comparison-result control unit 8 makes the values (in this situation, the buffer 71-1 is "3" and the buffers 71-2 and 71-3 are "0") that the buffers 71-1 to 71-3 hold output to the judgment unit 5*a*. Furthermore, with the judgment processing operation, the judgment unit 5*a* obtains the disaccord count value (in this situation "1") of the first comparison-result storing unit 6 and the total disaccord count value (in this situation "4"), and outputs the output signal Y (in this situation "L").

At the clock time t5, since it is a sampling period that matches the write cycle into the buffers 71 of the second comparison-result storing unit 7, just as at the clock time t2, after performing the within-write-cycle processing operation, the write processing into the buffers 71, which is the second comparison-result storing unit 7, is performed. First, at the clock time t5, the within-write-cycle processing operation is performed just as at the clock time t0.

Because here, the input signal X0 is "H" and the input signal X1 is "L", the comparison unit 3 makes the comparison result CMP into "H", and the latches 41-1 and 41-3 hold "H" and the latch 41-2 holds "L" with the first comparison result memory processing operation. In addition, with the second comparison result output processing operation, the comparison-result control unit 8 makes the values (in this situation, the buffer 71-1 is "3" and the buffers 71-2 and 71-3 are "0") that the buffers 71-1 to 71-3 hold output to the judgment unit 5*a*. Furthermore, with the judgment processing operation, the judgment unit 5*a* obtains the disaccord count value CNT (in this situation "2") of the first comparison-result storing unit 6 and the total disaccord count value (in this situation "5"), and outputs the output signal Y (in this situation "L"). Also, the judgment unit 5*a* outputs the disaccord count value CNT (in this situation "2") of the first comparison-result storing unit 6 to the second comparison-result storing unit 7.

From the clock time t5*a* after finishing the within-write-cycle processing operation in the sampling clock times starting from the clock time t5, the within-write-cycle processing operation is performed. First, at the clock time t5*a*, with a second comparison result memory processing operation, the buffers 71 of the second comparison-result storing unit 7 are made to hold the disaccord count value CNT of the first comparison-result storing unit 6. The comparison-result control unit 8, here, makes the buffer 71-2 hold the disaccord count value CNT (in this situation "2") of the first comparison-result storing unit 6 as a value (in this situation "2") that the write pointer value WP is advanced by 1. At the clock time t5*b* after the buffer 71-2 holds the disaccord count value CNT of the first comparison-result storing unit 6, the comparison-result control unit 8 makes the write signal WT into "L".

At the clock time t5*b*, with the first comparison result reset processing operation, the reset-signal generation unit 9 makes the reset signal RES1 into "H" to reset the outputs of the latches 41-1 to 41-3 into "L", and after the outputs of the latches 41-1 to 41-3 turn "L", makes the reset signal RES1 into "L".

At the clock times t6 and t7, only the within-write-cycle processing operation is performed just as at the clock time t0. At the clock time t6, because the input signal X0 is "H" and the input signal X1 is "L", the comparison unit 3 makes the comparison result CMP into "H", and the latch 41-1 holds "H" and the latches 41-2 and 41-3 hold "L" with the first comparison result memory processing operation. In addition, with the second comparison result output processing operation, the comparison-result control unit 8 makes the values (in this situation, the buffer 71-1 is "3", the buffer 71-2 is "2", and the buffer 71-3 is "0") that the buffers 71-1 to 71-3 hold output to the judgment unit 5*a*. Furthermore, with the judgment processing operation, the judgment unit 5*a* obtains the disaccord count value (in this situation "1") of the first comparison-result storing unit 6 and the total disaccord count value (in this situation "6"), and makes the output signal Y into "L".

At the clock time t7, because the input signal X0 is "H" and the input signal X1 is "L", the comparison unit 3 makes the comparison result CMP into "H", and the latches 41-1 and 41-2 hold "H" and the latch 41-3 holds "L" with the first comparison result memory processing operation. In addition, with the second comparison result output processing operation, the comparison-result control unit 8 makes the values (in this situation, the buffer 71-1 is "3", the buffer 71-2 is "2", and the buffer 71-3 is "0") that the buffers 71-1 to 71-3 hold output to the judgment unit 5*a*. Furthermore, with the judgment processing operation, the judgment unit 5*a* obtains the disaccord count value (in this situation "2") of the first comparison-result storing unit 6 and the total disaccord count value (in this situation "7"). Because here, the judgment threshold value is "7", the judgment unit 5*a* makes the output signal Y into a value (in this situation "H") showing abnormal.

At the clock time t8, since it is a sampling period that matches the write cycle into the buffers 71 of the second comparison-result storing unit 7, after performing the within-write-cycle processing operation just as at the clock time t2, the write processing into the buffers 71, which is the second comparison-result storing unit 7, is performed. First, at the clock time t8, the within-write-cycle processing operation is performed just as at the clock time t0.

Because here, the input signal X0 is "H" and the input signal X1 is "L", the comparison unit 3 makes the comparison result CMP into "H", and the latches 41-1 to 41-3 hold "H" with the first comparison result memory processing operation. In addition, with the second comparison result output processing operation, the comparison-result control unit 8 makes the values (in this situation, the buffer 71-1 is "3", the buffer 71-2 is "2", and the buffer 71-3 is "2",) that the buffers 71-1 to 71-3 hold output to the judgment unit 5*a*. Furthermore, with the judgment processing operation, the judgment unit 5*a* obtains the disaccord count value CNT (in this situation "3") of the first comparison-result storing unit 6 and the total disaccord count value (in this situation "8"), and makes the output signal Y into "H". Also, the judgment unit 5*a* outputs the disaccord count value CNT (in this situation "3") of the first comparison-result storing unit 6 to the second comparison-result storing unit 7.

From the clock time t8*a* after finishing the within-write-cycle processing operation in the sampling clock times starting from the clock time t8, the within-write-cycle processing operation is performed. First, at the clock time t8*a*, with a second comparison result memory processing operation, the buffers 71 of the second comparison-result storing unit 7 are made to hold the disaccord count value CNT of the first comparison-result storing unit 6. The comparison-result control unit 8, here, makes the buffer 71-3 hold the disaccord count value CNT (in this situation "3") of the first comparison-result storing unit 6 as a value (in this situation "3") that the write pointer value WP is advanced by 1. At the clock time t8*b* after the buffer 71-3 holds the disaccord count value CNT of the first comparison-result storing unit 6, the comparison-result control unit 8 makes the write signal WT into "L".

At the clock time t8*b*, with the first comparison result reset processing operation, the reset-signal generation unit 9 makes the reset signal RES1 into "H" to reset the outputs of the latches 41-1 to 41-3 into "L", and after the outputs of the latches 41-1 to 41-3 turn "L", makes the reset signal RES1 into "L".

At the clock times t9 and t10, only the within-write-cycle processing operation is performed just as at the clock time t0. At the clock time t10, because the input signal X0 is "H" and the input signal X1 is "L", the comparison unit 3 makes the comparison result CMP into "H", and the latch 41-1 holds "H" and the latches 41-2 and 41-3 hold "L" with the first comparison result memory processing operation. In addition, with the second comparison result output processing operation, the comparison-result control unit 8 makes the values (in this situation, the buffer 71-1 is "3", the buffer 71-2 is "2", and the ° buffer 71-3 is "3") that the buffers 71-1 to 71-3 hold output to the judgment unit 5*a*. Furthermore, with the judgment processing operation, the judgment unit 5*a* obtains the disaccord count value (in this situation "1") of the first comparison-result storing unit 6 and the total disaccord count value (in this situation "9"), and makes the output signal Y into "L".

At the clock time t10, because the input signal X0 is "H" and the input signal X1 is "L", the comparison unit 3 makes the comparison result CMP into "H", and the latches 41-1 and 41-2 hold "H" and the latch 41-3 holds "L" with the first comparison result memory processing operation. In addition, with the second comparison result output processing operation, the comparison-result control unit 8 makes the values (in this situation, the buffer 71-1 is "3", the buffer 71-2 is "2", and the buffer 71-3 is "3") that the buffers 71-1 to 71-3 hold output to the judgment unit 5*a*. Furthermore, with the judgment processing operation, the judgment unit 5*a* obtains the disaccord count value (in this situation "2") of the first comparison-result storing unit 6 and the total disaccord count value (in this situation "10"). and makes the output signal Y into "H".

At the clock time t11, since it is a sampling period that matches the write cycle into the buffers 71 of the second comparison-result storing unit 7, after performing the within-write-cycle processing operation just as at the clock time t2, the write processing into the buffers 71, which is the second comparison-result storing unit 7, is performed. First, at the clock time t11, the within-write-cycle processing operation is performed just as at the clock time t0.

Because here, the input signal X0 is "H" and the input signal X1 is "L", the comparison unit 3 makes the comparison result CMP into "H", and the latches 41-1 to 41-3 hold "H" with the first comparison result memory processing operation. In addition, with the second comparison result output processing operation, the comparison-result control unit 8 makes the values (in this situation, the buffer 71-1 is "3", the buffer 71-2 is "2", and the buffer 71-3 is "3",) that the buffers 71-1 to 71-3 hold output to the judgment unit 5a. Furthermore, with the judgment processing operation, the judgment unit 5a obtains the disaccord count value CNT (in this situation "3") of the first comparison-result storing unit 6 and the total disaccord count value (in this situation "8"), and makes the output signal Y into "H". Also, the judgment unit 5a outputs the disaccord count value CNT (in this situation "11") of the first comparison-result storing unit 6 to the second comparison-result storing unit 7.

From the clock time t11a after finishing the within-write-cycle processing operation in the sampling clock times starting from the clock time t11, the within-write-cycle processing operation is performed. First, at the clock time t11a, with a second comparison result memory processing operation, the buffers 71 of the second comparison-result storing unit 7 are made to hold the disaccord count value CNT of the first comparison-result storing unit 6. The comparison-result control unit 8, here, makes the buffer 71-3 hold the disaccord count value CNT (in this situation "3") of the first comparison-result storing unit 6 as a value (in this situation "1") that the write pointer value WP is advanced by 1. At the clock time t11b after the buffer 71-1 holds the disaccord count value CNT of the first comparison-result storing unit 6, the comparison-result control unit 8 makes the write signal WT into "L".

At the clock time t11b, with the first comparison result reset processing operation, the reset-signal generation unit 9 makes the reset signal RES1 into "H" to reset the outputs of the latches 41-1 to 41-3 into "L", and after the outputs of the latches 41-1 to 41-3 turn "L", makes the reset signal RES1 into "L".

As described above, in the present third embodiment, the comparison unit 3 compares whether or not the polarities of a plurality of redundant input signals X0 to Xk are accord with each other; the first comparison-result storing unit 6 holds n comparison results in the order of temporal sequence from the latest comparison result of the comparison unit 3 at every predetermined sampling cycle; when the first comparison-result storing unit 6 holds the n comparison results, the second comparison-result storing unit 7 holds the count value of the number of the comparison results showing that at least one polarity among the redundant multiple input signals X0 to Xk is disaccord with other in the order of temporal sequence among the n comparison results; and the judgment unit 5a obtains the count value of the comparison results showing that at least one polarity among the redundant multiple input signals X0 to Xk is disaccord with other among the n comparison results held in the first comparison-result storing unit 6, and the total value of the comparison results by adding count values from the latest count value to the count values in a predetermined number of samplings among the count values held in the second comparison-result storing unit 7, judges abnormal if the obtained total value is greater than or equal to a predetermined judgment threshold value, and judges normal if the obtained total value is less than the predetermined judgment threshold value, thereby enabling to judge normal or abnormal in accordance with the variation of the input signals X0 to Xk in the time of predetermined "sampling cycle×number of samplings" while suppressing the increase of resource even when the number of samplings is large.

In addition, although the present third embodiment is explained by citing a situation when the second comparison-result storing unit 7 is configured using a ring buffer, the second comparison-result storing unit 7 is not necessarily a ring buffer, but can be an appropriate memorizing unit that can hold the number of values showing disaccord held by the latches 41 of the first comparison-result storing unit 6.

Moreover, in the present third embodiment, although the comparison results showing that at least one polarity of the input signals X0 to Xk is disaccord with other are made to count to compare with the judgment threshold value, the comparison results showing that all the polarities of the input signals X0 to Xk are accord with each other can be made to count to compare with the judgment threshold value. In this situation, the second comparison-result storing unit 7 holds the count value of the comparison results showing that all the polarities of the input signals X0 to Xk are accord with each other among the n comparison results that the first comparison-result storing unit 6 holds. In this situation, the judgment unit 5 has only to output the output signal Y showing normal if the count value is greater than or equal to the judgment threshold value, and output the output signal Y showing abnormal if the count value is less than the judgment threshold value.

Fourth Embodiment

Figure 13:
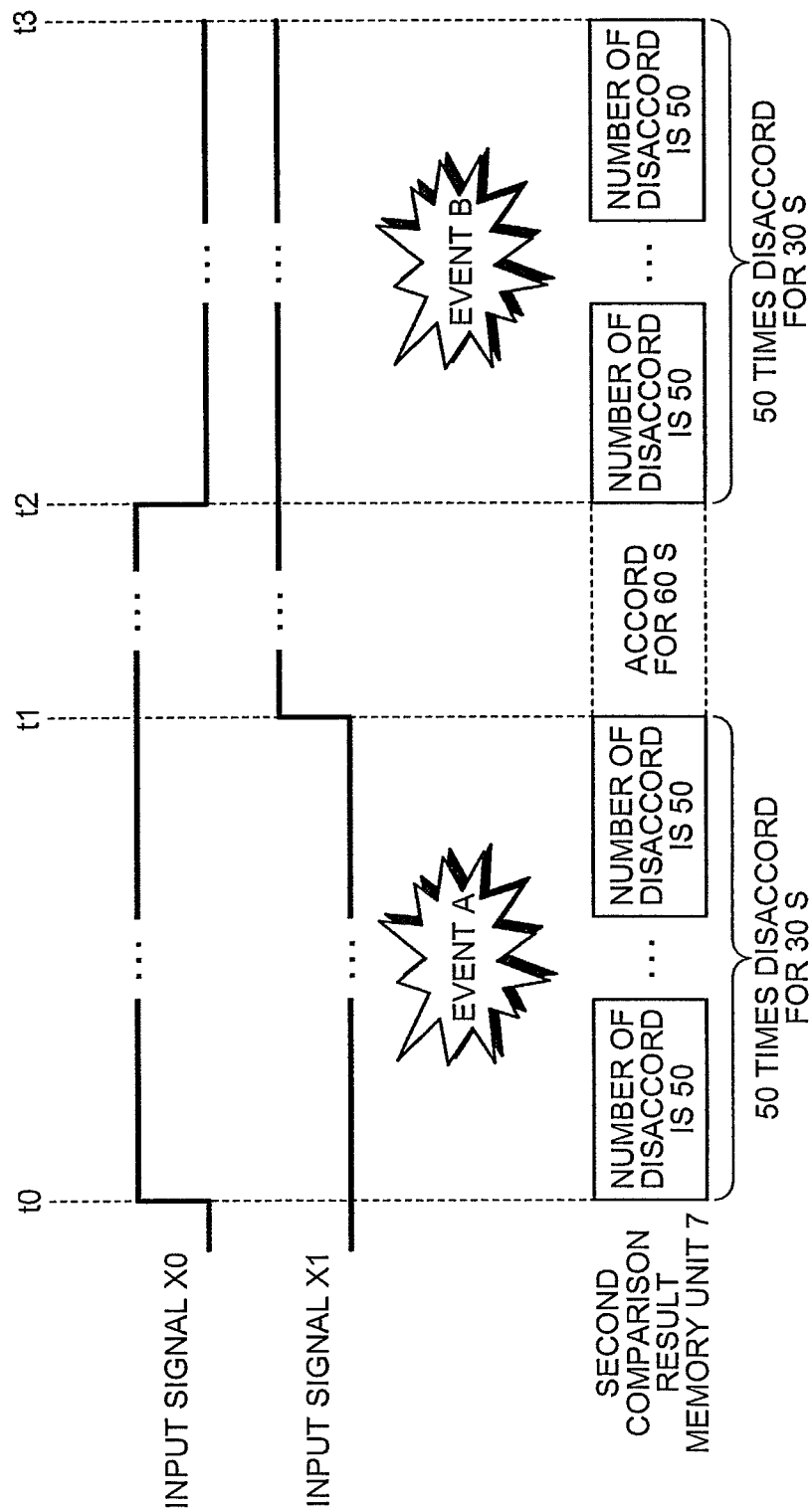
FIG. 13 is a diagram illustrating events detected by the fault detection apparatus in accordance with the third embodiment of the present invention.

A fourth embodiment of the present invention is explained with reference to FIGS. 13 to 15. In the third embodiment discussed above, the second comparison-result storing unit 7 is made to judge normal or abnormal in accordance with the ratio of accord or disaccord of the comparison results of the number of samplings from the latest comparison results, that is, the variation of the input signals X0 and X1 in the time of "sampling cycle×number of samplings" among the comparison results held by the latches of the first comparison-result storing unit 6 at every sampling clock time while suppressing the increase of resource even when the number of samplings is large by holding the count value of the comparison results showing disaccord or accord.

However, in the third embodiment discussed above, in order that the second comparison-result storing unit 7 may hold the count value of the comparison results showing disaccord or accord, the temporal sequence of the comparison results is lost. Because the time of "sampling cycle×number of samplings" becomes long, if the temporal sequence of the comparison results is lost, a problem might occur that the disaccord of input signals by different events is regarded as the same event.

For example, let the number of latches 41 be "50" (n=50), the sampling cycle be "20 ms (milliseconds)", and the number of effective buffers be "120" (h=120), the count value of disaccord or accord within 1 s (second) is held in the buffers 71 of the second comparison-result storing unit 7. As shown in FIG. 13, here, it is supposed that the input signal X0 is "H" from the clock time t0 to the clock time t2 and "L" from the clock time t2 to the clock time t3, and the input signal X1 is "L" from the clock time t0 to the clock time t1 and "H" from the clock time t1 to the clock time t3. In this situation, from the clock time t0 to the clock time t1 and from the clock time t2 to the clock time t3, both the comparison results become the values showing disaccord, and from the clock time t1 to the clock time t2, both the comparison results become the value showing accord. Therefore, in the second comparison-result storing unit 7, "50" is held in the buffers that hold the comparison results from the clock time t0 to the clock time t0 and from the clock time t2 to the clock time t3, and "0" is held in the buffer that holds the comparison result from the clock time t1 to the clock time t2.

From the clock time t0 to the clock time t1, here, an event A in which the comparison result is disaccord because the input signal X0 is "H" and the input signal X1 is "L" is occurred; meanwhile, from the clock time t2 to the clock time t3, an event B in which the comparison result is disaccord because the input signal X0 is "L" and the input signal X1 is "H" is occurred; so the disaccords of these two events A and B are different. Because the temporal sequence of the comparison results is lost in the second comparison-result storing unit 7, the event A might be regarded as the same event as the event B even though there is a period in which the input signal X0 is accord with the input signal X1 between the event A and the event B.

In order to improve such a problem, in the present fourth embodiment, in a period when the comparison results of the event A and the event B accord with each other, the values of the first comparison-result storing unit 6 and the second comparison-result storing unit 7 are reset, and accurate disaccord events are detected by distinguishing the two different events.

Figure 14:
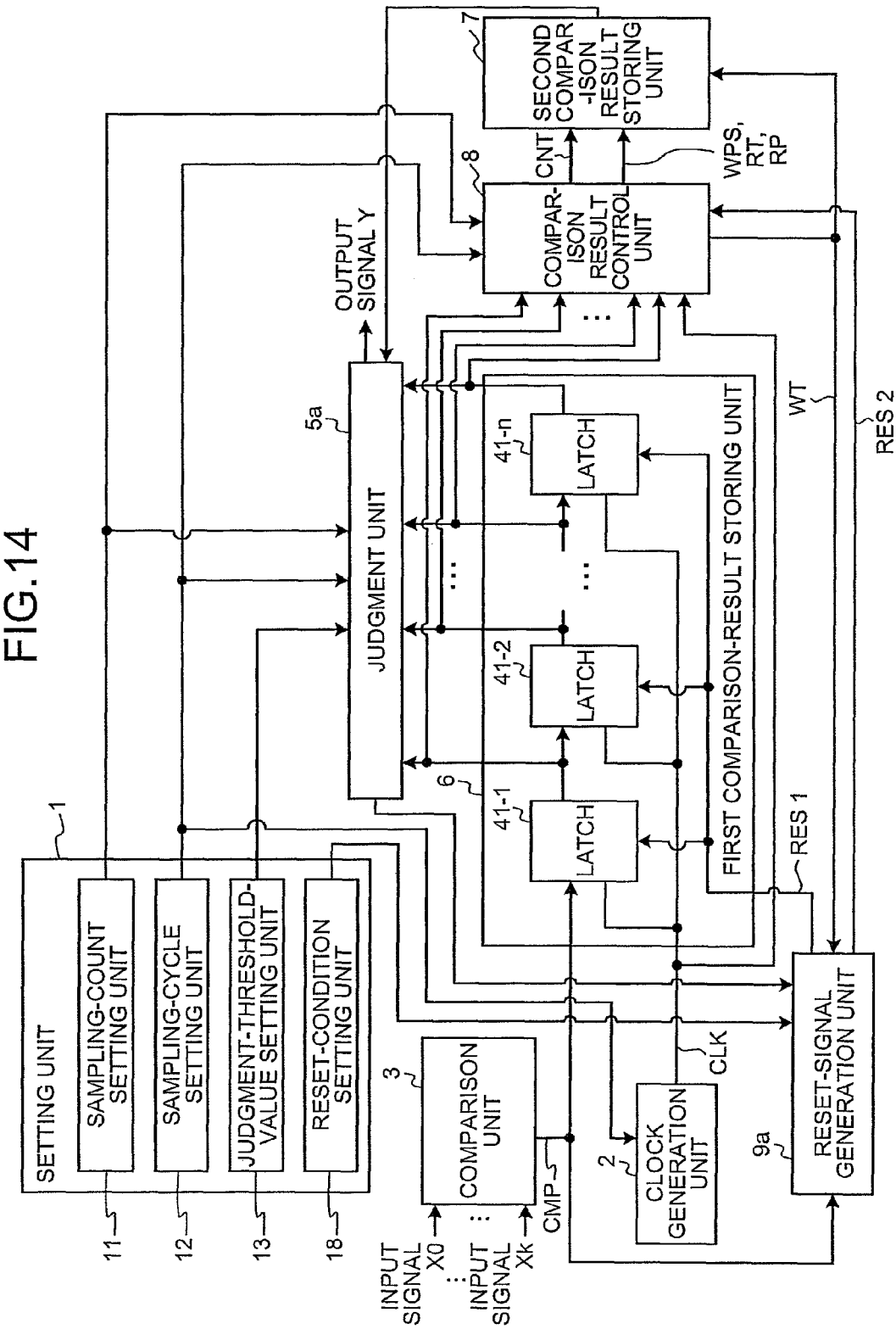
FIG. 14 is a block diagram illustrating a configuration of a fault detection apparatus in accordance with a fourth embodiment of the present invention.
Figure 15:
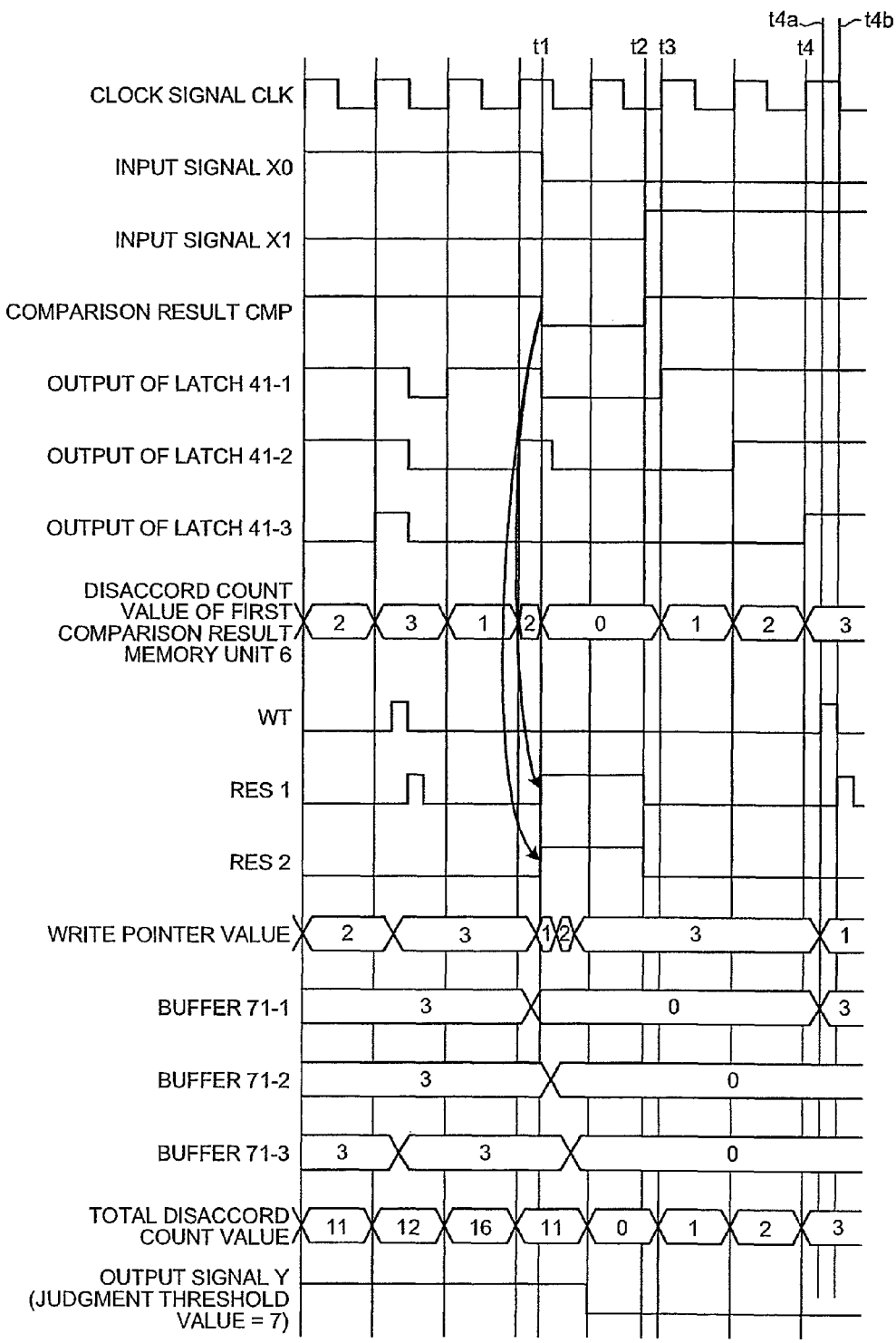
FIG. 15 is a timing chart illustrating an operation of the fault detection apparatus in accordance with the fourth embodiment of the present invention.

FIG. 14 is a block diagram illustrating a configuration of the fault detection apparatus in accordance with a fourth embodiment of the present invention. In the fault detection apparatus in accordance with the fourth embodiment shown in FIG. 14, a reset-condition setting unit 18 is added to the setting unit 1 of the fault detection apparatus in accordance with the third embodiment shown above in FIG. 13, and a reset-signal generation unit 9*a* is provided as a substitute for the reset-signal generation unit 9. For the same component having the same function as in the fault detection apparatus in accordance with the third embodiment shown above in FIG. 10, the same letter or numeral is put to abbreviate the overlapped explanation.

The reset-condition setting unit 18 is set to reset a condition to reset the values that the first comparison-result storing unit 6 and the second comparison-result storing unit 7 hold. The reset condition shall be any one of the following conditions:
(Condition 1) When the comparison result shows accord
(Condition 2) When the comparison result shows accord continuously during a period from the present sampling clock time to before the time of "y (2≤y, y: natural number)× sampling cycle"
(Condition 3) When the comparison result shows accord during a period from the present sampling clock time to before the time of "y×sampling cycle", more than or equal to a reset threshold value.

The reset-condition setting unit 18 is set to any one of a setting value showing that a reset by (Condition 1) to (Condition 3) described above is not performed, a setting value showing that a reset by (Condition 1) described above is performed, a setting value showing that a reset by (Condition 2) described above is performed, and a setting value showing that a reset by (Condition 3) described above is performed. In addition, if a setting value showing that the reset by (Condition 2) described above is performed is set, a value y showing the number of comparison results to judge and the reset threshold value are also set. Moreover, in this situation, the number of comparison results to judge and the reset threshold value are set to the same value. In addition, if a setting value showing that the reset by (Condition 3) described above is performed is set, a value y showing the number of comparison results to judge and the reset threshold value are also set. Moreover, the setting values to set to the reset-condition setting unit 18 are set from the remote master station 90 through communication just as the control parameters for the devices 81 connected to the remote I/O station 80. That is, the user can set any values.

The reset-signal generation unit 9*a*, in addition to the function of the reset-signal generation unit 9 in accordance with the third embodiment shown above in FIG. 10, not only resets the setting values set in the reset-condition setting unit 18 and the latches 41 of the first comparison-result storing unit 6 by making the rest signal RES1 into assert based on the comparison result CMP input from the comparison unit 3, but also resets the buffers 71 of the second comparison-result storing unit 7 through the comparison-result control unit 8 by making the rest signal RES2 into assert for a predetermined period.

Specifically, when the reset-condition setting unit 18 has been set to the setting value showing that the reset by (Condition 1) described above is performed, the reset-signal generation unit 9*a* monitors the comparison result CMP that the comparison unit 3 outputs, and makes the reset signals RES1 and RES2 into assert when the comparison result CMP changes from a value showing disaccord to a value showing accord.

When the reset-condition setting unit 18 has been set to the setting value showing that the reset by (Condition 2) described above is performed, the reset-signal generation unit 9*a* has a counting function to count up the count value when the comparison result CMP output from the comparison unit 3 shows accord and reset the count value when the comparison result CMP output from the comparison unit 3 shows disaccord; and with this counting function, the reset-signal generation unit 9*a* makes the reset signals RES1 and RES2 into assert when the count value counted using this counting function becomes more than or equal to the reset threshold count.

In addition, when the reset-condition setting unit 18 has been set to the setting value showing that the reset by (Condition 3) described above is performed, the reset-signal generation unit 9*a* has a counting function to count up the count value when the comparison result CMP output from the comparison unit 3 shows accord during a period from the present sampling clock time to before the time of "y×sampling cycle"; and with this counting function, the reset-signal generation unit 9*a* makes the reset signals RES1 and RES2 into assert when the count value counted using this counting function becomes more than or equal to the reset threshold count.

On the other hand, a timing to negate the reset signals RES1 and RES2 can be a time when the condition shown by the setting value set to the reset-condition setting unit 18 does not become effective, or a time after a predetermined time has passed after making the reset signals RES1 and RES2 into assert, where the predetermined time is a time necessary to reset the values of the latches 41 and the buffers 71.

In addition, when the reset signals RES1 and RES2 are made into negate after making them into assert, the timing to make the reset signals RES1 and RES2 into assert in the next time can be a time when the condition shown by the setting value set to the reset-condition setting unit 18 become effective after the comparison result shows disaccord at least once after making the reset signals RES1 and RES2 into negate.

Furthermore, although in (Condition 2) and (Condition 3) described above, here, the reset-signal generation unit 9*a* is made to count the comparison result CMP, the judgment unit 5a can count the number of the accord comparison results during a period from the present sampling clock time to before the time of "y (2≤y, y: natural number)×sampling cycle" based on the setting value set to the reset-condition setting unit 18, and output it to the reset-condition setting unit 18 when counting the number of disaccord or accord comparison results held by the latches 41.

In addition when the reset-condition setting unit 18 is set to a value showing that the reset by the (Condition 1) to (Condition 3) is not performed, the reset-signal generation unit 9a performs only the operation of the reset-signal generation unit 9a described above.

Next, the operation of the fault detection apparatus in accordance with the present fourth embodiment is explained with reference to a timing chart in FIG. 15 and FIG. 14. In addition, because a point of difference between the fault detection apparatus in accordance with the present fourth embodiment and the aforementioned fault detection apparatus in accordance with the third embodiment is only an operation when the reset-signal generation unit 9a makes the reset signals RES1 and RES2 into assert by any one of (Condition 1) to (Condition 3) described above, here, only the operation of the point of difference is explained by citing a situation when the reset signals RES1 and RES2 are made into assert by (Condition 1) described above.

At the clock time t1, the input signal X0 changes from "H" to "L". With this, both the input signals X0 and X1 become "L", and the comparison unit 3 makes the comparison result CMP into a value (in this situation "L") showing that the input signal X0 is accord with the input signal X1.

The reset-condition setting unit 18 is set to perform the reset when the set (Condition 1) described above, that is, the comparison result CMP shows accord. Therefore, the reset-signal generation unit 9a acknowledges that the reset condition becomes effective when the comparison result CMP has become "L", and makes the reset signals RES1 and RES2 into assert (in this situation "H").

When the reset signal RES1 becomes "H", the latches 41 make the outputs into values showing accord (in this situation "L"). On the other hand, when the reset signal RES2 becomes "H", the comparison-result control unit 8 makes the write signal WT into assert (in this situation "H"), and makes the write pointer WP as "1", "2", and "3" to write "0" into all the buffers 71 of the second comparison-result storing unit 7 to reset the buffers 71 thereof.

At the clock time t2, the input signal X1 changes from "L" to "H". With this, the input signal X0 becomes disaccord with the input signal X1, and the comparison unit 3 makes the comparison result CMP into a value (in this situation "H") showing that the input signal X0 is disaccord with the input signal X1. When the comparison result CMP of the comparison unit 3 becomes "H", the reset-signal generation unit 9a makes the reset signals RES1 and RES2 into negate (in this situation "L"). When the reset signal RES2 becomes "L", the comparison-result control unit 8 starts measuring the write cycle Tw from the next sampling clock time (here, clock time t3).

At the clock time t3, because the input signal X0 is "L" and the input signal X1 is "H", the comparison unit 3 makes the comparison result CMP into "H". The comparison-result control unit 8 starts measuring the write cycle Tw from the clock time t3, so from this clock time t3 to the clock time t4, only the within-write-cycle processing operation explained above in the third embodiment is performed.

At the clock time t4, because it is a sampling period that matches the write cycle into the buffers 71 of the second comparison-result storing unit 7, after performing the within-write-cycle processing operation, the write cycle processing operation explained above in the third embodiment is performed.

As explained above, according to the fourth embodiment of the present invention, when the comparison results of the comparison unit 3 show that all the polarities of the redundant input signals X0 to Xk are accord with each other, when the comparison results of the comparison unit 3 show that all the polarities of the redundant input signals X0 to Xk are accord with each other continuously for a predetermined number, or when the number of the comparison results showing that all the polarities of the redundant input signals X0 to Xk are accord with each other becomes greater than or equal to a predetermined number, the reset-signal generation unit 9a is made to reset the first comparison-result storing unit 6 and the second comparison-result storing unit 7, thereby enabling to accurately detect a disaccord event by distinguish different events.

Specifically, an event A during the clock time from t0 to t1 shown above in FIG. 13, that is, the disaccord event when the input signal X0 is "H" and the input signal X1 is "L" can be distinguished from an event B during the clock time from t2 to t3, that is, the disaccord event B when the input signal X0 is "L" and the input signal X1 by resetting the reset-signal generation unit 9a when the input signal X0 is accord with the input signal X1 during the clock time from t1 to t2, thereby enabling to accurately detect the disaccord events.

In addition, in the present fourth embodiment, the reset condition can be set to the reset-condition setting unit 18, thereby enabling to change the reset condition for distinguishing events in accordance with a system to apply this apparatus.

Moreover, in the embodiments 1 to 4, although the fault detection apparatus in accordance with the present invention is explained by citing an example when applying it to the remote I/O station 80, it is not limited to apply it to the remote I/O station 80.

Furthermore, generally, a CPU for controlling and monitoring the devices 81 is often installed in the remote I/O station 80. The aforementioned each function realized by the clock generation unit 2, the comparison unit 3, and the judgment unit 5 in accordance with the first embodiment or the second embodiment, the aforementioned each function realized by the clock generation unit 2, the comparison unit 3, the judgment unit 5a, the comparison-result control unit 8, and the reset-signal generation unit 9 in accordance with the third embodiment, or the aforementioned each function realized by the clock generation unit 2, the comparison unit 3, the judgment unit 5a, the comparison-result control unit 8, and the reset-signal generation unit 9a in accordance with the fourth embodiment can be realized by software and executed using the CPU inside the remote I/O station 80 or a special-purpose CPU.

Industrial Applicability

As described above, the fault detection apparatus according to the present invention are useful for detecting a malfunction of the circuit that generates a plurality of redundant input signals, and are particularly suitable for detecting a malfunction of the redundant input signals in the remote I/O stations at a production site.

The invention claimed is:
1. A fault detection apparatus comprising:
a memory comprising a comparison-result storing unit; and a processor which executes a comparison unit and a judgment unit;

wherein the comparison unit compares polarities of a plurality of redundant input signals, each of which indicates a detection of input to a device from a respective input source, wherein the comparison-result storing unit stores therein a comparison result from the comparison unit for each predetermined sampling cycle, wherein the judgment unit judges whether the plurality of redundant input signals are normal using a plurality of comparison results for a predetermined number of samplings in a time-series order from a latest comparison result among a plurality of comparison results stored in the comparison-result storing unit, and wherein the judgment unit counts number of comparison results showing that all the polarities of the plurality of redundant input signals match with each other among the comparison results for the number of samplings for each sampling cycle, and makes a judgment as normal when the count value is equal to or larger than a predetermined judgment threshold value and abnormal otherwise, and wherein the comparison unit compares the polarities of the redundant input signals to each other.

2. The fault detection apparatus according to claim 1, wherein the judgment unit performs a weighting on the comparison results of the number of samplings and counts the number of comparison results on which the weighting is performed.

3. The fault detection apparatus according to claim 1, wherein the judgment unit compares a match/mismatch pattern of the comparison results arranged in the time-series order from the latest comparison result among the comparison results of the number of samplings stored in the comparison-result storing unit with a predetermined judgment pattern, and makes the judgment based on a result of comparing the patterns.

4. The fault detecting apparatus according to claim 1, wherein the number of samples prior to making the judgment by the judgment unit is preset by an operator in a master station that remotely connects to an input/output stations that comprises the judgment unit and that controls at least one device at a production site.

5. The fault detecting apparatus according to claim 1, wherein different weights are applied by the judgment unit to each of the comparison results in a respective sampling cycle depending on temporal sequence of the respective comparison result.

6. The fault detecting apparatus according to claim 1, wherein each of the plurality of redundant input signals from the respective input source indicate same input to the same device and wherein the redundant input signals are output from a plurality of input sources, each outputting a signal in response to the same input to the same device.

7. The fault detecting apparatus according to claim 1, wherein the device is an input/output station that controls at least one external device connected thereto.

8. The fault detecting apparatus according to claim 1, wherein the device comprises an input detection unit which is determined to operate normally or abnormally by the judging unit.

9. A fault detection apparatus comprising:
a memory comprising a comparison-result storing unit; and
a processor which executes a comparison unit and a judgment unit;

wherein the comparison unit compares polarities of a plurality of redundant input signals, each of which indicates a detection of input to a device from a respective input source, wherein the comparison-result storing unit stores therein a comparison result of the comparison unit for each predetermined sampling cycle, wherein the judgment unit judges whether the plurality of redundant input signals are normal using a plurality of comparison results for a predetermined number of samplings in a time-series order from a latest comparison result among a plurality of comparison results stored in the comparison-result storing unit, wherein the judgment unit counts number of comparison results showing that at least one of the polarities of the plurality of redundant input signals is different among the comparison results for the number of samplings for each sampling cycle, and makes a judgment as abnormal when the count value is equal to or larger than a predetermined judgment threshold value and normal otherwise, and wherein the comparison unit compares the polarities of the redundant input signals to each other.

10. The fault detection apparatus according to claim 9, wherein the judgment unit performs a weighting on the comparison results of the number of samplings and counts the number of comparison results on which the weighting is performed.

11. The fault detection apparatus according to claim 9, wherein the judgment unit compares a match/mismatch pattern of the comparison results arranged in the time-series order from the latest comparison result among the comparison results of the number of samplings stored in the comparison-result storing unit with a predetermined judgment pattern, and makes the judgment based on a result of comparing the patterns.

12. A fault detection apparatus comprising:
a memory comprising a first comparison-result storing unit and a second comparison result storing unit; and
a processor which executes a comparison unit and a judgment unit;

wherein the comparison unit compares polarities of a plurality of redundant input signals, each of which indicates a detection of input to a device from a respective input source, wherein the first comparison-result storing unit stores therein n comparison results of the comparison unit for each predetermined sampling cycle from a latest comparison result in a time-series order, where n is a positive integer;

wherein the second comparison-result storing unit stores therein, when n comparison results are stored in the first comparison-result storing unit, a count value showing that all the polarities of the plurality of redundant input signals match with each other in the time-series order, wherein the judgment unit adds, for each sampling cycle, a count value of the comparison results showing that all the polarities of the redundant input signals match with each other among the count values stored in the second comparison-result storing unit to a count value from a latest count value to a count value of a predetermined number of samplings among the n comparison results stored in the first comparison-result storing unit to obtain a total count value of the comparison results showing that all the plurality of the redundant input signals match with each other among the comparison results of the number of samplings, and makes a judgment as normal when the total count value is equal to or larger than a predetermined judgment threshold value and abnormal when the total count value is smaller than the predetermined judgment threshold value, and wherein the comparison unit compares the polarities of the redundant input signals to each other.

13. The fault detection apparatus according to claim 12, further comprising a reset unit that resets values stored in the first comparison-result storing unit and the second comparison-result storing unit when a predetermined condition is satisfied.

14. The fault detection apparatus according to claim 13, wherein the predetermined condition is one of a condition that the comparison results of the comparison unit show that all the polarities of the redundant input signals match with each other, a condition that the comparison results of the comparison unit show that all the polarities of the redundant input signals match with each other continuously for a pre-determined number of times, and a condition that number of comparison results showing that all the polarities of the redundant input signals match with each other in a predetermined period is equal to or larger than a predetermined number.

15. A fault detection apparatus comprising:
a memory comprising a first comparison-result storing unit and a second comparison result storing unit; and
a processor which executes a comparison unit and a judgment unit;
wherein the comparison unit that compares polarities of a plurality of redundant input signals, whether the polarities of the redundant input signals match with each other, where each of the plurality of redundant input signals indicates a detection of input to a device from a respective input source,
wherein the first comparison-result storing unit stores therein n comparison results of the comparison unit for each predetermined sampling cycle from a latest comparison result in a time-series order, where n is a positive integer,
wherein the second comparison-result storing unit stores therein, when n comparison results are stored in the first comparison-result storing unit, a count value showing that at least one of the polarities of the plurality of redundant input signals is different in the time-series order, and
wherein the judgment unit adds, for each sampling cycle, a count value of the comparison results showing that at least one of the polarities of the redundant input signals is different among the count values stored in the second comparison-result storing unit to a count value from a latest count value to a count value of a predetermined number of samplings among the n comparison results stored in the first comparison-result storing unit to obtain a total count value of the comparison results showing that at least one of the plurality of the redundant input signals is different among the comparison results of the number of samplings, and makes a judgment as abnormal when the total count value is equal to or larger than a predetermined judgment threshold value and normal when the total count value is smaller than the predetermined judgment threshold value.

16. The fault detection apparatus according to claim 15, further comprising a reset unit that resets values stored in the first comparison-result storing unit and the second comparison-result storing unit when a predetermined condition is satisfied.

17. The fault detection apparatus according to claim 16, wherein the predetermined condition is one of a condition that the comparison results of the comparison unit show that all the polarities of the redundant input signals match with each other, a condition that the comparison results of the comparison unit show that all the polarities of the redundant input signals match with each other continuously for a predetermined number of times, and a condition that number of comparison results showing that all the polarities of the redundant input signals match with each other in a predetermined period is equal to or larger than a predetermined number.

18. A fault detection apparatus comprising:
a memory comprising a comparison-result storing unit; and
a processor which executes a comparison um and a judgment unit;
wherein the comparison unit compares polarities of a plurality of redundant input signals, each of which indicates a detection of input to a device from a respective input source,
wherein the comparison-result storing unit stores therein a comparison result from the comparison unit for each predetermined sampling cycle,
wherein the judgment unit judges whether the plurality of redundant input signals are normal using a plurality of comparison results for a predetermined number of samplings in a time-series order from a latest comparison result among a plurality of comparison results stored in the comparison-result storing unit,
wherein the judgment unit counts number of comparison results showing that all the polarities of the plurality of redundant input signals match with each other among the comparison results for the number of samplings for each sampling cycle, and makes a judgment as normal when the count value is equal to or larger than a predetermined judgment threshold value and abnormal otherwise, and
wherein the judging unit judges whether an input detection unit operates as normal or abnormal, wherein the input detection unit is provided in the device which is an input/output station that controls at least one external device connected thereto.

19. The fault detecting apparatus according to claim 18, wherein the input detection unit detects operation of a user and output the detection of the operation regardless of the plurality of redundant input signals generated by various components of the input detection unit.

20. The fault detecting apparatus according to claim 18, further comprising: a threshold storing unit, which receives the predetermined judgment threshold value and the cycling sample from a master station remotely connected to the input/output station in a production site and which provides the predetermined judgment threshold to the judgment unit.

* * * * *